United States Patent
Bae et al.

(10) Patent No.: US 12,028,749 B2
(45) Date of Patent: Jul. 2, 2024

(54) TRANSMISSION DEVICE AND RECEPTION DEVICE FOR DATA IN WIRELESS AV SYSTEM

(71) Applicant: LG ELECTRONICS INC., Seoul (KR)

(72) Inventors: Hyowon Bae, Seoul (KR); Jinmin Kim, Seoul (KR); Jaewook Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 17/595,264

(22) PCT Filed: May 23, 2019

(86) PCT No.: PCT/KR2019/006155
§ 371 (c)(1),
(2) Date: Nov. 12, 2021

(87) PCT Pub. No.: WO2020/235719
PCT Pub. Date: Nov. 26, 2020

(65) Prior Publication Data
US 2022/0248265 A1 Aug. 4, 2022

(51) Int. Cl.
*H04W 28/06* (2009.01)
(52) U.S. Cl.
CPC .................................. *H04W 28/06* (2013.01)
(58) Field of Classification Search
CPC ...................... H04N 21/43637; H04N 21/615; H04L 65/70; H04L 65/611; H04L 65/80; H04L 65/1069; H04W 28/06
See application file for complete search history.

(56) References Cited

U.S. PATENT DOCUMENTS

| | | | |
|---|---|---|---|
| 6,909,708 B1 * | 6/2005 | Krishnaswamy | ... H04L 63/0861 379/93.07 |
| 2006/0034174 A1 * | 2/2006 | Nishibayashi | ........ H04L 1/1642 370/235 |

(Continued)

FOREIGN PATENT DOCUMENTS

| KR | 20170056673 | 5/2017 |
|---|---|---|
| WO | 2017179901 | 10/2017 |

OTHER PUBLICATIONS

PCT International Application No. PCT/KR2019/006155, International Search Report dated Feb. 20, 2020, 4 pages.

*Primary Examiner* — Syed Ali
(74) *Attorney, Agent, or Firm* — LEE, HONG, DEGERMAN, KANG & WAIMEY

(57) ABSTRACT

The present disclosure relates to a transmission device and reception device for data in a wireless AV system. The transmission device comprises: a processor for encoding media data thereby generating a compressed bitstream; and a communication unit for: fragmenting the compressed bitstream and mapping the compressed bitstream to an MSDU; generating, for transmission of the MSDU, an MPDU frame sequentially comprising an MAC header, a frame body, and an FCS for the MAC header; generating, for the transmission of the MPDU frame, a PPDU sequentially comprising a preamble, at least one PSDU, and a TRN field; and transmitting the PPDU frame through a radio channel. A radio resource for transmission of actually necessary data can be secured by minimizing unnecessary overhead information (i.e., control-related information in the MAC header) from among data transmitted over radio.

14 Claims, 24 Drawing Sheets

(56) References Cited

U.S. PATENT DOCUMENTS

| | | | |
|---|---|---|---|
| 2006/0056443 A1* | 3/2006 | Tao | H04L 1/1628 370/469 |
| 2011/0044338 A1* | 2/2011 | Stahl | H04L 12/2838 370/392 |
| 2011/0261823 A1* | 10/2011 | Singh | H04L 45/245 370/395.2 |
| 2011/0305176 A1* | 12/2011 | Wentink | H04W 28/12 370/310 |
| 2014/0036772 A1* | 2/2014 | Asterjadhi | H04W 28/06 370/328 |
| 2014/0126580 A1* | 5/2014 | Sampath | H04L 1/1858 370/428 |
| 2015/0256323 A1 | 9/2015 | Gandarillas Diego et al. | |
| 2016/0330714 A1* | 11/2016 | Hedayat | H04L 5/0023 |
| 2017/0257795 A1 | 9/2017 | Stacey | |
| 2018/0054803 A1* | 2/2018 | Yoshimura | H04W 72/04 |
| 2018/0063299 A1 | 3/2018 | Genossar et al. | |
| 2018/0083793 A1* | 3/2018 | Kim | H04L 45/16 |

* cited by examiner

FIG. 3
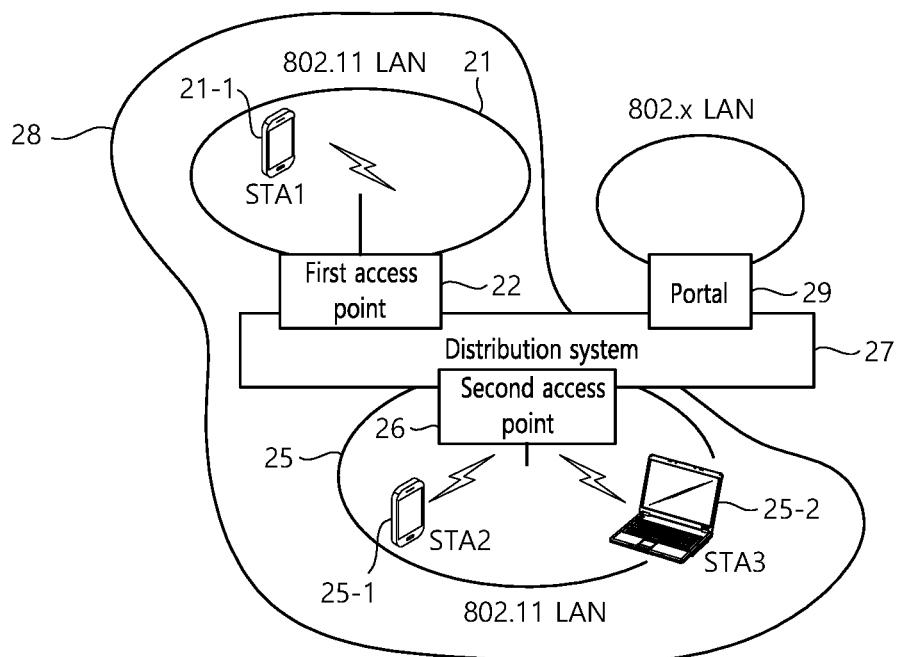
(A)
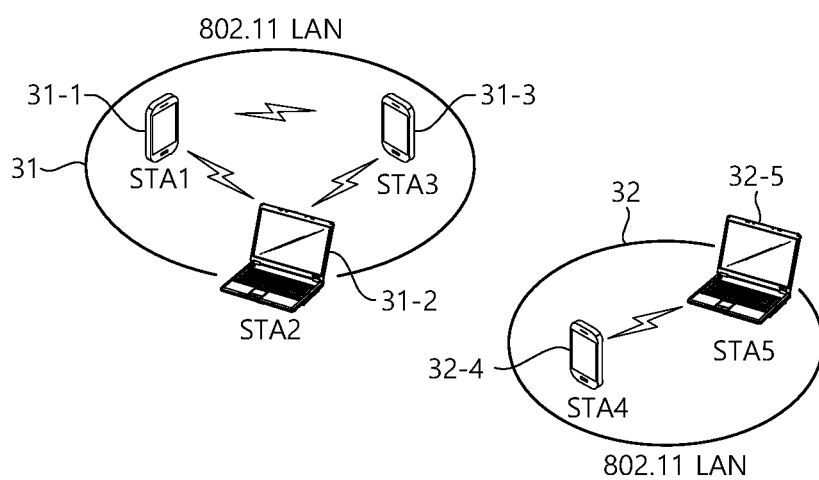
(B)

FIG. 12

| Required T-put  25.91  Gbps ||||||
|---|---|---|---|---|---|
| TRX Time (ms) @ MCS21 : SIFS + Data + SIFS + BlockAck ||||||
| Buffer Config || Legacy ||| Candi.2:<br>A-MSDU<br>Modify | Candi.5:<br>A-MPDU<br>Modify |
| ms | MB | (a) | (d) | (c) | | |
| 0.100 | 0.309 | 0.097 | 0.098 | 0.097 | 0.097 | 0.097 |
| 0.200 | 0.618 | 0.178 | 0.178 | 0.178 | 0.178 | 0.178 |
| 0.300 | 0.927 | 0.258 | 0.259 | 0.258 | 0.258 | 0.259 |
| 0.400 | 1.235 | 0.339 | 0.340 | 0.339 | 0.339 | 0.340 |
| 0.500 | 1.544 | 0.419 | 0.421 | 0.419 | 0.420 | 0.421 |
| 0.600 | 1.853 | 0.500 | 0.502 | 0.500 | 0.500 | 0.501 |
| 0.700 | 2.162 | 0.581 | 0.583 | 0.581 | 0.581 | 0.582 |
| 0.800 | 2.471 | 0.661 | 0.664 | 0.661 | 0.662 | 0.663 |
| 0.900 | 2.780 | 0.742 | 0.745 | 0.742 | 0.742 | 0.744 |
| 1.000 | 3.089 | 0.822 | 0.826 | 0.823 | 0.823 | 0.825 |

(1) TRX time(ms)

| MAC Dummy (bytes) ||||||
|---|---|---|---|---|---|
| Buffer Config || Legacy ||| Candi.2:<br>A-MSDU<br>Modify | Candi.5:<br>A-MPDU<br>Modify |
| ms | # of<br>Aggreg. | (a) | (d) | (c) | | |
| 0.100 | 41 | 30 | 1,394 | 112 | 276 | 902 |
| 0.200 | 82 | 30 | 2,788 | 194 | 522 | 1,802 |
| 0.300 | 123 | 30 | 4,182 | 276 | 768 | 2,706 |
| 0.400 | 164 | 30 | 5,576 | 358 | 1,014 | 3,608 |
| 0.500 | 205 | 30 | 6,970 | 440 | 1,260 | 4,510 |
| 0.600 | 246 | 30 | 8,364 | 522 | 1,506 | 5,412 |
| 0.700 | 287 | 30 | 9,758 | 604 | 1,752 | 6,312 |
| 0.800 | 328 | 30 | 11,152 | 686 | 1,998 | 7,216 |
| 0.900 | 369 | 30 | 12,546 | 768 | 2,244 | 8,118 |
| 1.000 | 409 | 30 | 13,906 | 848 | 2,484 | 8,998 |

(2) MAC Dummy (bytes)

FIG. 18

| Required T-put 25.91 Gbps | | | | | | | |
|---|---|---|---|---|---|---|---|
| TRX Time (ms) @ MCS21 : SIFS + Data + SIFS + BlockAck | | | | | | | |
| Buffer Config | | Legacy | | | Candi.2: A-MSDU Modify | Candi.5: A-MPDU Modify | Candi.6: A-MSDU Modify + A-PPDU |
| ms | MB | (a) | (d) | (c) | | | |
| 0.100 | 0.309 | 0.097 | 0.098 | 0.097 | 0.097 | 0.097 | 0.100 |
| 0.200 | 0.618 | 0.178 | 0.178 | 0.178 | 0.178 | 0.178 | 0.180 |
| 0.300 | 0.927 | 0.258 | 0.259 | 0.258 | 0.258 | 0.259 | 0.261 |
| 0.400 | 1.235 | 0.339 | 0.340 | 0.339 | 0.339 | 0.340 | 0.341 |
| 0.500 | 1.544 | 0.419 | 0.421 | 0.419 | 0.420 | 0.421 | 0.422 |
| 0.600 | 1.853 | 0.500 | 0.502 | 0.500 | 0.500 | 0.501 | 0.503 |
| 0.700 | 2.162 | 0.581 | 0.583 | 0.581 | 0.581 | 0.582 | 0.583 |
| 0.800 | 2.471 | 0.661 | 0.664 | 0.661 | 0.662 | 0.663 | 0.664 |
| 0.900 | 2.780 | 0.742 | 0.745 | 0.742 | 0.742 | 0.744 | 0.745 |
| 1.000 | 3.089 | 0.822 | 0.826 | 0.823 | 0.823 | 0.825 | 0.825 |

(1) TRX time(ms)

| MAC Dummy (bytes) | | | | | | | |
|---|---|---|---|---|---|---|---|
| Buffer Config | | Legacy | | | Candi.2: A-MSDU Modify | Candi.5: A-MPDU Modify | Candi.6: A-MSDU Modify + A-PPDU |
| ms | # of Aggreg. | (a) | (d) | (c) | | | |
| 0.100 | 41 | 30 | 1,394 | 112 | 276 | 902 | 276 |
| 0.200 | 82 | 30 | 2,788 | 194 | 522 | 1,802 | 522 |
| 0.300 | 123 | 30 | 4,182 | 276 | 768 | 2,706 | 768 |
| 0.400 | 164 | 30 | 5,576 | 358 | 1,014 | 3,608 | 1,014 |
| 0.500 | 205 | 30 | 6,970 | 440 | 1,260 | 4,510 | 1,260 |
| 0.600 | 246 | 30 | 8,364 | 522 | 1,506 | 5,412 | 1,506 |
| 0.700 | 287 | 30 | 9,758 | 604 | 1,752 | 6,312 | 1,752 |
| 0.800 | 328 | 30 | 11,152 | 686 | 1,998 | 7,216 | 1,998 |
| 0.900 | 369 | 30 | 12,546 | 768 | 2,244 | 8,118 | 2,244 |
| 1.000 | 409 | 30 | 13,906 | 848 | 2,484 | 8,998 | 2,484 |

(2) MAC Dummy (bytes)

FIG. 22

| Required T-put   25.91   Gbps ||||||||
|---|---|---|---|---|---|---|---|
| TRX Time (ms) @ MCS21 : SIFS + Data + SIFS + BlockAck ||||||||
| Buffer Config || Legacy ||| Candi.2: A-MSDU Modify | Candi.5: A-MPDU Modify | Candi.6: A-MSDU Modify + A-PPDU | Candi.9: A-MSDU Modify + EDMG Header-A |
| ms | MB | (a) | (d) | (c) | | | | |
| 0.100 | 0.309 | 0.097 | 0.098 | 0.097 | 0.097 | 0.097 | 0.100 | 0.097 |
| 0.200 | 0.618 | 0.178 | 0.178 | 0.178 | 0.178 | 0.178 | 0.180 | 0.178 |
| 0.300 | 0.927 | 0.258 | 0.259 | 0.258 | 0.258 | 0.259 | 0.261 | 0.258 |
| 0.400 | 1.235 | 0.339 | 0.340 | 0.339 | 0.339 | 0.340 | 0.341 | 0.339 |
| 0.500 | 1.544 | 0.419 | 0.421 | 0.419 | 0.420 | 0.421 | 0.422 | 0.420 |
| 0.600 | 1.853 | 0.500 | 0.502 | 0.500 | 0.500 | 0.501 | 0.503 | 0.500 |
| 0.700 | 2.162 | 0.581 | 0.583 | 0.581 | 0.581 | 0.582 | 0.583 | 0.582 |
| 0.800 | 2.471 | 0.661 | 0.664 | 0.661 | 0.662 | 0.663 | 0.664 | 0.662 |
| 0.900 | 2.780 | 0.742 | 0.745 | 0.742 | 0.742 | 0.744 | 0.745 | 0.742 |
| 1.000 | 3.089 | 0.822 | 0.826 | 0.823 | 0.823 | 0.825 | 0.825 | 0.823 |

(1) TRX time(ms)

| MAC Dummy (bytes) ||||||||
|---|---|---|---|---|---|---|---|
| Buffer Config || Legacy ||| Candi.2: A-MSDU Modify | Candi.5: A-MPDU Modify | Candi.6: A-MSDU Modify + A-PPDU | Candi.9: A-MSDU Modify + EDMG Header-A |
| ms | # of Aggreg. | (a) | (d) | (c) | | | | |
| 0.100 | 41 | 30 | 1,394 | 112 | 276 | 902 | 276 | 256 |
| 0.200 | 82 | 30 | 2,788 | 194 | 522 | 1,802 | 522 | 502 |
| 0.300 | 123 | 30 | 4,182 | 276 | 768 | 2,706 | 768 | 748 |
| 0.400 | 164 | 30 | 5,576 | 358 | 1,014 | 3,608 | 1,014 | 994 |
| 0.500 | 205 | 30 | 6,970 | 440 | 1,260 | 4,510 | 1,260 | 1,240 |
| 0.600 | 246 | 30 | 8,364 | 522 | 1,506 | 5,412 | 1,506 | 1,486 |
| 0.700 | 287 | 30 | 9,758 | 604 | 1,752 | 6,312 | 1,752 | 1,732 |
| 0.800 | 328 | 30 | 11,152 | 686 | 1,998 | 7,216 | 1,998 | 1,978 |
| 0.900 | 369 | 30 | 12,546 | 768 | 2,244 | 8,118 | 2,244 | 2,224 |
| 1.000 | 409 | 30 | 13,906 | 848 | 2,484 | 8,998 | 2,484 | 2,464 |

(2) MAC Dummy (bytes)

TRANSMISSION DEVICE AND RECEPTION DEVICE FOR DATA IN WIRELESS AV SYSTEM

CROSS-REFERENCE TO RELATED APPLICATIONS

This application is the National Stage filing under 35 U.S.C. 371 of International Application No. PCT/KR2019/006155, filed on May 23, 2019, the contents of which is hereby incorporated by reference herein in its entirety.

BACKGROUND OF THE DISCLOSURE

Field of the Disclosure

The present disclosure relates to wireless communication, and more specifically, to an apparatus and method for transmitting data and an apparatus and method for receiving data in a wireless audio/video (WAV) system.

Related Art

Recently, demand for high-definition and high-quality images such as high definition (HD) images and ultra-high definition (UHD) images has increased in various fields. Since the amount of information or bits to be transmitted relatively increases as image data becomes high-definition and high-quality data, transmission cost may increase when image data is transmitted using a medium such as a conventional wired/wireless broadband line.

Meanwhile, the Institute of Electrical and Electronics Engineers (IEEE) 802.11ad standard is a high-speed wireless communication standard operating in a band of 60 GHz or higher. It has signal coverage of about 10 meters but can support throughput of 6 Gbps or more. Since it operates in a high frequency band, signal propagation is dominated by ray-like propagation. Signal quality can be improved as a transmit (TX) or receive (RX) antenna beam is aligned toward a strong spatial signal path. Currently, the IEEE 802.11ay standard, an evolved version of IEEE 802.11ad, is under development.

Established standards such as IEEE 802.11ad or ay series are based on multiple access and communication of a plurality of devices. Accordingly, data formats or frame formats used by a medium access control (MAC) layer or a physical layer of the IEEE 802.11ad or ay series include a plurality of control information fields for controlling and managing resources and operations of numerous devices. However, most applications of a wireless AV system to which the present disclosure pertains are based on 1:1 wireless communication (e.g., communication between a wireless set-top box and a wireless TV). If the wireless AV system is implemented using an existing standard method as it is, a plurality of control information fields included in a data format and a frame format of the existing standard may become unnecessary overhead that is discarded without being used.

Accordingly, there is a need for a method capable of improving communication performance of a wireless AV system by reducing overhead.

SUMMARY

The present disclosure provides a data transmission apparatus and reception apparatus in a wireless AV system.

The present disclosure also provides a data transmission apparatus and reception apparatus in a wireless AV system for improving communication performance of the wireless AV system by reducing overhead of MAC data or PHY data.

The present disclosure also provides a data transmission apparatus and reception apparatus for providing a frame check sequence (FCS) in units of segment based on the concept of an aggregated MAC protocol data unit (A-MPDU) in a wireless AV system.

The present disclosure also provides a data transmission apparatus and reception apparatus for supporting backward compatibility with IEEE 802.11ad or ay standards up to at least a first address (address1) of a MAC header in a wireless AV system.

The present disclosure also provides a data transmission apparatus and reception apparatus for minimizing a MAC dummy based on the concept of a short aggregated MAC service data unit (A-MSDU).

An aspect of the present disclosure provides an apparatus for transmitting data in a wireless AV system. The apparatus includes a processor configured to code media data to generate a compressed bitstream, and a communication unit configured to fragment the compressed bitstream, to map the fragmented compressed bitstream to a medium access channel (MAC) service data unit (MSDU), to generate a MAC protocol data unit (MPDU) sequentially including a MAC header, a frame body, and a frame check sequence (FCS) regarding the MAC header for transmission of the MSDU, to generate a PHY protocol data unit (PPDU) sequentially including a preamble, at least one PHY service data unit (PSDU), and a training (TRN) field for transmission of the MPDU frame, and to transmit the PPDU frame through a wireless channel.

Here, the MAC header sequentially includes a frame control (FC) field, a duration field, and a receiver address (RA) field, and the MAC header includes only the RA field as a field related to an address.

In an aspect, 0 bits may be allocated to a service set ID (SSID) field in the MAC header.

In another aspect, the MAC header may sequentially include the FC field, the duration field, the RA field, a sequence field, and a quality of service (QoS) field.

In another aspect, the frame body may include only the MSDU, and the communication unit may generate an aggregated MPDU (A-MPDU) frame by aggregating a plurality of MPDU frames and maps the A-MPDU frame to the PSDU to generate the PPDU frame.

In another aspect, the MAC header may sequentially include the FC field, the duration field, the RA field, a length field, and the quality of service (QoS) field, the frame body may include a header of the frame body and a plurality of sub-bodies, the header of the frame body may sequentially include the FC field, the duration field, and the RA field, and each sub-body may sequentially include a sequence field, an MSDU corresponding to the sequence field, and an FCS regarding the frame body.

In another aspect, the communication unit may determine whether to perform retransmission in units of MSDUs of each sub-body based on the FCS regarding the frame body.

In another aspect, the communication unit may map the MAC header to a first PSDU, map the frame body and the FCS regarding the MAC header to a second PSDU, and generate an aggregated PPDU (A-PPDU) frame by aggregating the first PSDU and the second PSDU.

In another aspect, the communication unit may map at least a portion of the MAC header to at least a portion of the preamble and map the frame body and the FCS regarding the MAC header to the PSDU to generate the PPDU frame.

In another aspect, at least a portion of the preamble may be EDMG-header A.

In another aspect, at least a portion of the MAC header may be the RA field, the length field, and the QoS field.

Another aspect of the present disclosure provides an apparatus for receiving data in a wireless audio video (AV) system. The apparatus includes a communication unit configured to receive a PHY protocol data unit (PPDU) frame through a wireless channel, to obtain a preamble, at least one PHY service data unit (PSDU), and a training (TRN) field from the PPDU frame, to obtain a MAC protocol data unit (MPDU) frame from the PSDU, to obtain a MAC header, a frame body, and a frame check sequence (FCS) regarding the MAC header from the MPDU frame, to obtain a fragmented medium access channel (MAC) service data unit (MSDU) from the frame body, and to obtain a compressed bitstream from the fragmented MSDU, and a processor configured to decode the compressed bitstream to obtain media data.

Here, the MAC header may sequentially include a frame control (FC) field, a duration field, and a receiver address (RA) field, and the MAC header may include only the RA field as a field related to an address.

In another aspect, 0 bits may be allocated to a service set ID (SSID) field in the MAC header.

In another aspect, the MAC header may sequentially include the FC field, the duration field, the RA field, a sequence field, and a quality of service (QoS) field.

In another aspect, the frame body may include only the MSDU, and the communication unit may obtain the MPDU frame from an aggregated MPDU (A-MPDU) obtained by aggregating a plurality of MPDU frames.

In another aspect, the MAC header may sequentially include the FC field, the duration field, the RA field, a length field, and the quality of service (QoS) field, the frame body may include a header of the frame body and a plurality of sub-bodies, the header of the frame body may sequentially include the FC field, the duration field, and the RA field, and each sub-body sequentially may include a sequence field, an MSDU corresponding to the sequence field, and an FCS regarding the frame body.

In another aspect, the communication unit may determine whether there is a reception error in units of MSDUs of each sub-body based on the FCS regarding the frame body.

In another aspect, the communication unit may obtain a first PSDU and a second PSDU from an aggregated PPDU (A-PPDU) frame, obtain the MAC header from the first PSDU, and obtain the frame body and the FCS regarding the MAC header from the second PSDU.

In another aspect, the communication unit may obtain at least a portion of the MAC header from at least a portion of the preamble and obtain the frame body and the FCS regarding the MAC header from the PPDU frame.

In another aspect, at least a portion of the preamble may be EDMG-header A.

In another aspect, at least a portion of the MAC header may be the RA field, the length field, and the QoS field.

It is possible to secure radio resources for actually necessary data transmission by minimizing unnecessary overhead information (i.e., control related information in the MAC header) among wirelessly transmitted data, to improve a data transmission rate through reduction in overhead information, and to design a MAC/PHY data format or frame format customized for a wireless AV system.

BRIEF DESCRIPTION OF THE DRAWINGS

FIG. 3 is a conceptual diagram of a case where the wireless data transceiving system according to an embodiment of the present disclosure is implemented according to an IEEE 802.11 series communication protocol.

FIG. 12 is an example of results of simulation for comparing performances of various MPDU frames.

FIG. 18 is another example of results of simulation for comparing performances of various MPDU frames.

FIG. 22 is another example of results of simulation for comparing performances of various MPDU frames.

DESCRIPTION OF EXEMPLARY EMBODIMENTS

Figure 1:
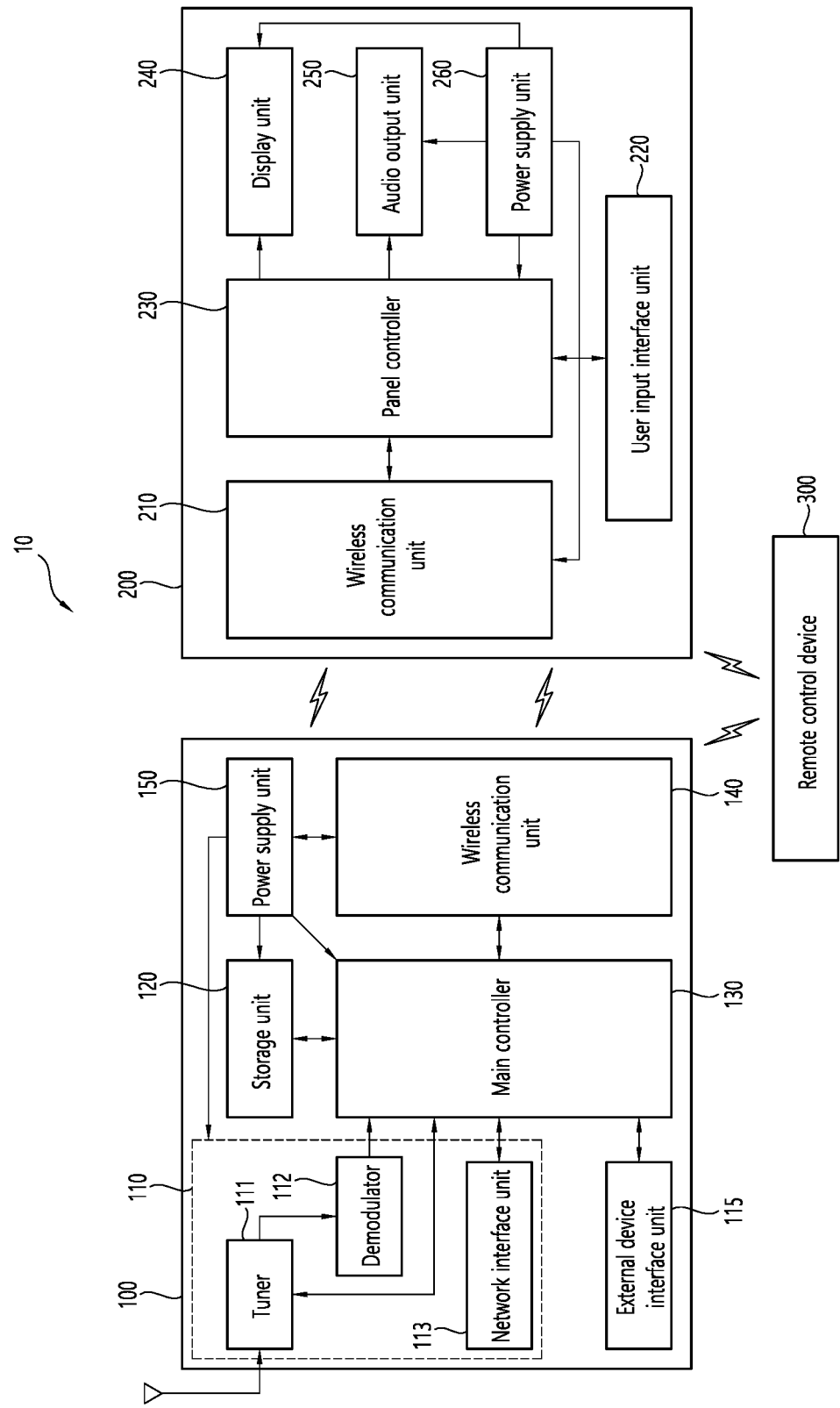
FIG. 1 is a block diagram of a wireless display system according to an embodiment.

The following detailed description illustrates embodiments of a device and method for transmitting wireless data and embodiments of a device and method for receiving wireless data that are provided according to the present disclosure. And, such embodiments do not represent the only forms of the present disclosure. The characteristics and features of the present disclosure are described with reference to exemplary embodiments presented herein. However, functions and structures that are similar or equivalent to those of the exemplary embodiments described in the present specification may be included in the scope and spirit of the present disclosure and may be achieved by other intended embodiments. Throughout the present specification, similar reference numerals will be used to refer to similar components or features. Hereinafter, embodiments of the present disclosure will be described in detail with reference to the accompanying drawings.

In recent years, the design of display devices, such as TVs, has become important, and display panels have become thinner with the development and evolution of technologies for display panels, such as OLED. However, due to the thickness of a driving circuit that is required in order to drive a display panel, there have been restrictions (or limitations) in manufacturing and designing thinner display panels. Therefore, a technology that is capable of separating components excluding components that are mandatorily required to be physically and electrically connected to the display panel, from the display panel, and equipping the physically or electrically separated components to a separate device (hereinafter referred to as a "main device") is being considered as a promising technology. In this case, a main device and a display device may be configured to exchange image signals and audio signals based on a wireless communication between the main device and the display device. The present disclosure relates to a wireless AV system, or a wireless display system being equipped with a main device and a display device that are provided as physically and/or electrically independent components, wherein media may be played (or reproduced) based on a wireless communication between the devices.

FIG. 1 is a block diagram of a wireless display system according to an embodiment of the present disclosure.

Referring to FIG. 1, a wireless display system 10 may include a main device 10, a display panel device 200, and a remote control device 300.

The main device 100 may perform an operation of receiving an external signal in a wired or wireless format that is related to audio, video, pictures, images, multimedia, or at least one combination thereof, processing the received external signal by using various methods, so as to generate a data stream or a bitstream, and transmitting the generated data stream or bitstream to the display device 200.

In order to perform such operation, the main device 100 may include an external signal receiver 110, an external device interface unit 115, a storage unit 120, a main controller 130, a wireless communication unit 140, and a power supply unit 150.

The external signal receiver 110 may include a tuner 111, a demodulator 112, and a network interface unit 113.

The tuner 111 receives an external signal in a wired or wireless format that is related to audio, video, pictures, images, multimedia, or at least one combination thereof. For example, the tuner 111 may select a specific broadcast channel in accordance with a channel selection command and may receive a broadcast signal corresponding to the selected specific broadcast channel.

The demodulator 112 may separate the received broadcast signal to a video signal, an image signal, a picture signal, an audio signal, and a data signal related to a broadcast program. And, then, the demodulator 112 may reconstruct (or restore or recover) the separated video signal, image signal, picture signal, audio signal, and data signal to a format that can be outputted.

The external device interface unit 115 may receive an application or an application list of a nearby (or neighboring) external device and may deliver (or communicate) the application or application list to the main controller 130 or storage unit 120.

The external device interface unit 115 may provide a connection path between the wireless AV system 100 and an external device. The external device interface unit 115 may receive an external input signal including audio, video, pictures, images, multimedia, or at least one combination thereof from an external device, which is connected to the main device 100 via wired or wireless connection, and may then deliver the received external input signal to the main controller 130. The external device interface unit 115 may include multiple external input terminals. The multiple external input terminals may include an RF terminal, an RGB terminal, one or more High Definition Multimedia Interface (HDMI) terminals, a USB terminal, a component terminal, an AV terminal, a CI terminal.

An external device that is connectable to the external device interface unit 115 may be any one of a set-top box, a Bluray player, a DVD player, a gaming system, a sound bar, a smart phone, a PC, a USB memory, a home theater system. However, these are merely exemplary.

The network interface unit 113 may provide an interface for connecting the main device 100 to a wired/wireless network including an internet network. The network interface unit 113 may transmit or receive data to or from another user or another electronic device through an accessed network or another network that is linked to the accessed network.

Additionally, some content data stored in the main device 100 may be transmitted to a user or an electronic device, which is selected from other users or other electronic devices that are pre-registered in the main device 100.

The network interface unit 113 may access a predetermined webpage through an accessed network or another network that is linked to the accessed network. That is, the network interface unit 113 may transmit or receive data to or from a corresponding server by accessing a predetermined webpage through the network.

Also, the network interface unit 113 may receive contents or data provided from a content provider or a network operator. That is, the network interface unit 113 may receive contents such as movies, advertisements, games, VODs, and broadcast signals, which are provided from a content provider or a network provider, and related information through the network.

Additionally, the network interface unit 113 may receive firmware update information and update files provided from a network operator and may transmit data to an internet or content provider or a network operator.

The network interface unit 113 may select and receive a wanted application among applications that are open to public, through the network.

The storage unit 120 may store programs for performing processing and control of each signal within the main controller 130, and then the storage unit 120 may store signal-processed image, voice, or data signals.

Additionally, the storage unit 120 may perform a function for temporarily storing image, voice, or data signals that are inputted from the external device interface unit 115 or network interface unit 113, and the storage unit 120 may also store information related to a predetermined image through a channel memory function.

The storage unit 120 may store an application or an application list that is inputted from the external device interface unit 115 or network interface unit 113.

The main controller 130 may control the main device 100 by using a user instruction (or command) that is inputted through the remote control device 300, or by using an internal program, and may access a network in order to be capable of downloading an application or an application list that is wanted by a user to the main device 100.

The main controller 130 enables user-selected channel information to be outputted along with a processed image or audio signal through a display device 200 or an audio output unit 250.

Additionally, the main controller 130 enables an image signal or audio signal, which is inputted from an external device, e.g., a camera or camcorder, through the external device interface unit 115, to be outputted through the display device 200 or audio output unit 250 in accordance with according to an external device image playback instruction (or command) that is received through the remote control device 300.

The main controller 130 may perform a control operation so that content stored in the storage unit 120, received broadcast content, or externally input content can be played back (or reproduced). Such content may be configured in various formats, such as a broadcast image, an externally inputted image, an audio file, a still image, an accessed (or connected) web screen, a document file, and so on.

The main controller 130 may decode a video, an image, a picture, a sound, or data related to a broadcast program being inputted through the demodulator 112, the external device interface unit 115, or the storage unit 120. Then, the main controller 130 may process the decoded data in accordance with encoding/decoding methods supported by the display device 200. Thereafter, the main controller 130 may process the encoded data by using various video/audio processing methods, such as compression and encoding, so as to transmit the corresponding data through a wireless channel, thereby generating a data stream or bitstream. Finally, the main controller 130 may transmit the generated data stream or bitstream to the display device 200 through the wireless communication unit 140. Depending upon the embodiments, the main controller 130 may also bypass the decoded data, without encoding the decoded data in accordance with the encoding/decoding methods supported by the display device 200, and may directly transmit the decoded data to the display device 200 through the wireless communication unit 140.

The main controller 130 may be configured to implement the functions, procedures, and/or methods of a processor 1130 of a wireless data transmitting device 1100 that are to be described with reference to each embodiment of the present specification. Layers of the wireless interface protocol may be implemented in the processor 1130.

The wireless communication unit 140 may be operatively coupled to the main controller 130, for example, as a combination of a wireless communication chip and an RF antenna. The wireless communication unit 140 may receive a data stream or bitstream from the main controller 130, may generate a wireless stream by encoding and/or modulating the data stream or bitstream into a format that can be transmitted through a wireless channel, and may transmit the generated wireless stream to the display device 200. The wireless communication unit 140 establishes a wireless link, and the main device 100 and the display device 200 are connected through the wireless link. The wireless communication unit 140 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication by using a communication protocol, such as a standard of the IEEE 802.11 series.

The power supply unit 150 supplies power to the external signal receiver 110, the external device interface unit 115, the storage unit 120, the main controller 130, and the wireless communication unit 140. Methods for receiving power from an external source performed by the power supply unit 150 may include a terminal method and a wireless method. In case the power supply unit 150 receives power by using a wireless method, the power supply unit 150 may include a separate configuration in order to wirelessly receive power. For example, the power supply unit 150 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The wireless communication unit 140 may also be wirelessly connected to the remote control device 300, thereby being capable of transferring (or delivering) signals inputted by the user to the main controller 130 or transmitter (or delivering) signals from the main controller 130 to the user. For example, the wireless communication unit 140 may receive or process control signals, such as power on/off, screen settings, and so on, of the main device 100 from the remote control device 300 or may process control signals received from the main controller 130 so that the processed signals can be transmitted to the remote control device 300 in accordance with various communication methods, such as Bluetooth, Ultra Wideband (WB), ZigBee, Radio Frequency (RF), or Infrared (IR) communication, and so on.

Additionally, the wireless communication unit 140 may deliver (or communicate) control signals that are inputted from a local key (not shown), such as a power key, a volume key, a setup key, and so on, to the main controller 130.

Subsequently, the display device 200 may process a wireless stream, which is received from the main device 100 through a wireless interface, by performing a reverse process of a signal processing operation that is performed by the main device 100, and, then, the display device 200 may output a display or audio (or sound). In order to perform such operation, the display device 200 may include a wireless communication unit 210, a user input interface unit 220, a panel controller 230, a display unit 240, an audio output unit 250, and a power supply unit 260.

The wireless communication unit 210 may be configured as a combination of a wireless communication chip and an RF antenna. The wireless communication unit 210 is connected to the wireless communication unit 140 of the main device 100 through a wireless link and performs wireless communication with the wireless communication unit 140 of the main device 100. More specifically, the wireless communication unit 210 receives a wireless stream from the wireless communication unit 140 of the main device 100, demodulates the received wireless stream, and transmits the demodulated wireless stream to the panel controller 230. The wireless communication unit 210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication by using a communication protocol, such as a standard of the IEEE 802.11 series.

The panel controller 230 decodes a signal that is demodulated by the wireless communication unit 210 so as to reconstruct (or recover) a bitstream or data stream. At this point, in case the bitstream or data stream is a compressed stream, the panel controller 230 may decompress or reconstruct the bitstream or data stream. Thereafter, the panel controller 230 may output the bitstream or data stream as a video signal, an image signal, a picture signal, an audio signal, or a data signal related to a broadcast program, and may transmit the signals to the display unit 240, the audio output unit 250, and the user input interface unit 220.

The video signal, the picture signal, the image signal, and so on, that are inputted to the display unit 240 may be displayed as a picture corresponding to the inputted picture signal. Alternatively, the picture signal that is processed by the panel controller 230 may be transmitted back to the main device 100 through the wireless communication unit 210 and may then be inputted to an external output device through the external device interface unit 115 of the main device 100.

The audio signal that is processed by the panel controller 230 may be audio-outputted to the audio output unit 250. Moreover, the audio signal that is processed by the panel controller 230 may be transmitted back to the main device 100 through the wireless communication unit 210 and may then be inputted to an external output device through the external device interface unit 115 of the main device 100.

Meanwhile, the panel controller 230 may control the display unit 240 so as to display a picture (or image). For example, the panel controller 230 may perform control operation, so that a broadcast picture (or image) that is inputted through the tuner 111, an externally inputted picture (or image) that is inputted through the external device interface unit 115, a picture (or image) that is inputted through the network interface unit, or a picture (or image) that is stored in the storage unit 120 can be displayed on the display unit 240. In this case, the picture (or image) that is displayed on the display unit 240 may be a still picture (or image) or a video, and may be a 2D image or a 3D image.

The panel controller 230 may be configured to implement the functions, procedures, and/or methods of a processor 1230 included in a wireless data receiving device 1200, which will be described with reference to each embodiment of the present specification. Additionally, the processor 1230 may be configured to implement the functions, procedures, and/or methods of the wireless data receiving 1200 that will be described with reference to each embodiment of the present specification.

The user input interface unit 220 may transmit a signal that is inputted, by the user, to the panel controller 230 or may transmit a signal from the panel controller 230 to the user. For example, the user input interface 220 may receive and process control signals, such as power on/off, screen settings, and so on, of the display device 200 from the remote control device 300, or may process control signals received from the panel controller 230 so that the processed signals can be transmitted to the remote control device 300 in accordance with various communication methods, such as Bluetooth, Ultra Wideband (WB), ZigBee, Radio Frequency (RF), or Infrared (IR) communication, and so on.

The user input interface unit 220 may transmit a control signal, which is inputted through a local key (not shown), such as a power key, a volume key, a setup key, and so on, to the panel controller 230.

The power supply unit 260 supplies power to the wireless communication unit 210, the user input interface unit 220, the panel controller 230, the display unit 240, and the audio output unit 250. Methods for receiving power from an external source performed by the power supply unit 260 may include a terminal method and a wireless method. In case the power supply unit 260 receives power by using a wireless method, the power supply unit 260 may include a separate configuration in order to wirelessly receive power. For example, the power supply unit 260 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The remote control device 300 performs an operation of remotely controlling various features of the main device 100 or the display device 200, such as power on/off, channel selection, screen setup, and so on. Herein, the remote control device 300 may also be referred to as a "remote controller (or remote)".

Meanwhile, since the main device 100 and the display device 200, which are shown in FIG. 1, are provided only as an example of one embodiment of the present disclosure, some of the illustrated components may be integrated or omitted, or other components may be added according to the specifications of the main device 100 and the display device 200, which are actually implemented. That is, as necessary, two or more components may be integrated into one component, or one component may be divided into two or more components. In addition, a function that is performed in each block is presented to describe an embodiment of the present disclosure, and a specific operation or device will not limit the scope and spirit of the present disclosure.

According to another embodiment of the present disclosure, unlike the example shown in FIG. 1, the main device 100 may receive and play-back (or reproduce) an image (or picture) through the network interface unit 113 or the external device interface unit 115 without including the tuner 111 and the demodulator 112.

For example, the main device 100 may be implemented by being divided into an image processing device, such as a set-top box, for receiving broadcast signals or content according to various network services, and a content playback device for playing content input from the image processing device.

In this case, an operating method of the wireless AV system 10 according to an embodiment of the present disclosure that will hereinafter be described may be performed not only by the main device 100 and the display device 200, as described above with reference to FIG. 1, but also by one of the divided image processing device, such as the set-top box, or content playback device, which includes an audio output unit 250.

In light of system input/output, the main device 100 may be referred to as a wireless source device that wirelessly provides a source, and the display device 200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the main device 100 may be integrated to a form that configures part of a wireless set-top box, a wireless gaming console, a wireless digital video disc (DVD) player, a wireless router, or the like. In this case, the main device 100 may be provided as a wireless communication module or a chip. The display device 200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the display device 200 may be provided in the form of a wireless communication module or chip.

The main device 100 and the display device 200 may be integrated to forms that configure parts of a mobile device. For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the main device 100 and the display device 200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

As described above, the main device 100 may receive an external signal in a wired or wireless format that is related to a medium, such as audio, video, a picture, an image, multimedia, or at least one combination thereof, and the main device 100 may process the received external signal by using various methods, so as to generate a data stream or bitstream, and may transmit the data stream or bitstream to the display device 200 through a wireless interface.

Hereinafter, image (or picture)/video/audio data that are transmitted through a wireless interface will be collectively referred to as wireless data. That is, the main device 100 may wirelessly communicate with the display device 200 and may transmit wireless data. Therefore, in light of a wireless data transceiving system 1000, the main device 100 may be referred to as a wireless data transmitting device 1100, and the display device 200 may be referred to as a wireless data receiving device 1200. Hereinafter, the present disclosure will be described in more detail in light of the wireless data transceiving system 1000. Firstly, a detailed block diagram of the wireless data transceiving system 1000 will be illustrated.

Figure 2:
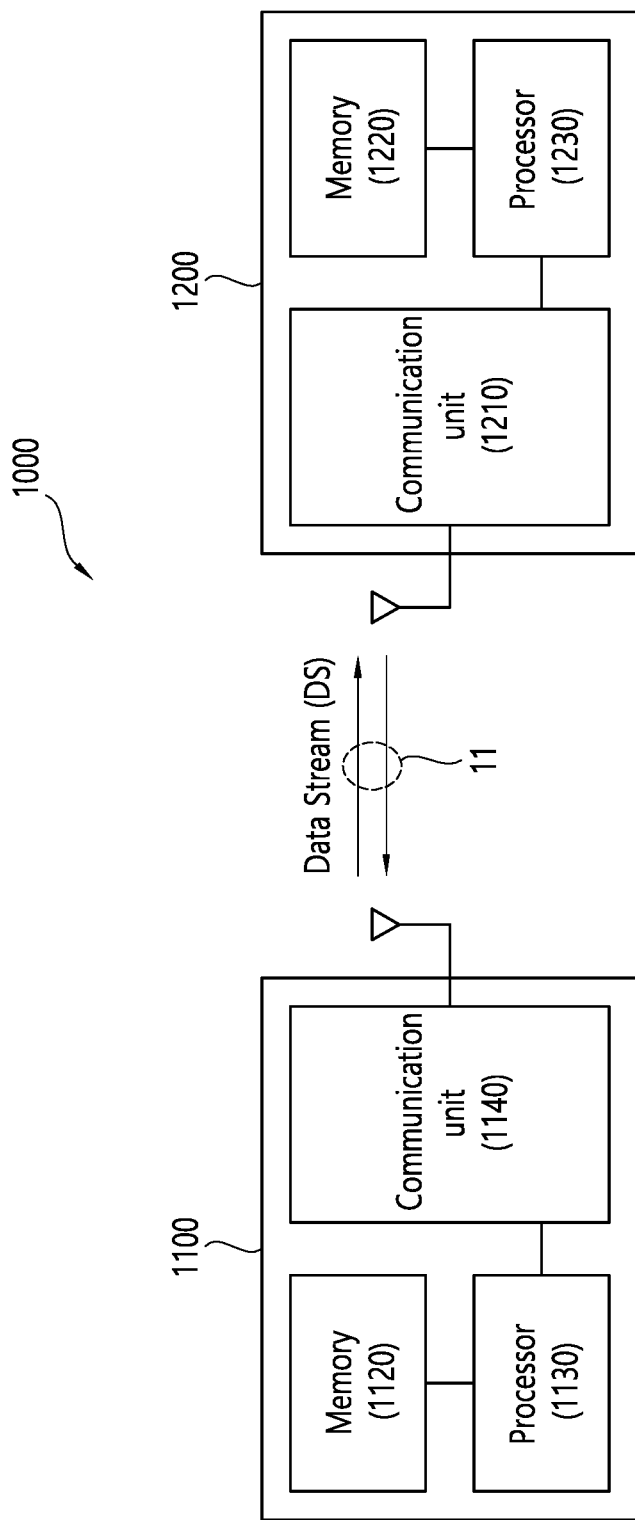
FIG. 2 is a block diagram showing a wireless data transceiving system according to an embodiment of the present disclosure.

FIG. 2 is a block diagram showing a wireless data transceiving system according to an embodiment of the present disclosure.

Referring to FIG. 2, a wireless data transceiving system 1000 refers to a system that wirelessly transmits and receives a data stream. And, the wireless data transceiving system 1000 includes a wireless data transmitting 1100 and at least one wireless data receiving device 1200. The wireless data transmitting device 1100 is communicatively coupled to the at least one wireless data receiving device 1200.

According to an aspect, the data may be configured of an audio, a video, a picture, an image, multimedia, or at least one combination thereof.

According to another aspect, the data may include a bitstream in the form of a compressed audio, a bitstream in the form of a compressed video, a bitstream in the form of a compressed picture, a bitstream in the form of compressed multimedia, or at least one combination thereof. In this case, the wireless data transceiving system 1000 may also be referred to as a wireless compressed data stream transceiving system. Additionally, the wireless compressed data stream transceiving system 1000 may further include a functional or physical unit for compressing data.

Referring to the detailed configuration of each device, the wireless data transmitting device 1100 includes a processor 1130, a memory 1120, and a communication unit 1140, and the wireless data receiving device 1200 includes a communication unit 1210, a memory 1220, and a processor 1230.

The processor 1130 may be configured to implement the functions, procedures, and/or methods of the wireless data transmitting device 1100 that are to be described with reference to each embodiment of the present specification. Also, the processor 1230 may also be configured to implement the functions, procedures, and/or methods of the wireless data receiving device 1200 that are to be described with reference to each embodiment of the present specification. Layers of the wireless interface protocol may be implemented in the processors 1130 and 1230.

In light of the display system in FIG. 1, the processor 1130 may be configured to perform the function of the main controller 130. For example, the processor 1130 may decode a video, an image, a picture, a sound, or data related to a broadcast program that are inputted through the demodulator 112, the external device interface unit 115, or the storage unit 120, may process the decoded data by using various video/audio processing methods, such as compression and encoding, so as to transmit the data through a wireless channel, thereby generating a data stream or bitstream, and may transmit the generated data stream or bitstream to the display device 200 through the communication unit 1140.

The memories 1120 and 1220 are operatively coupled with the processors 1130 and 1230 and store various types of information for operating the processors 1130 and 1230.

The communication units 1140 and 1210 are operatively coupled with the processors 1130 and 1230 and wirelessly transmit and/or receive data. The communication units 1140 and 1210 establish a wireless link 11, and the wireless data transmitting device 1100 and the wireless data receiving device 1200 are inter-connected through the wireless link 11. The communication units 1140 and 1210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication by using a communication protocol, such as a standard of the IEEE 802.11 series.

FIG. 3 is a conceptual diagram of a case where the wireless data transceiving system according to an embodiment of the present disclosure is implemented according to an IEEE 802.11 series communication protocol.

Referring to FIG. 3, a wireless data transceiving system 20 in (A) of FIG. 3 may include at least one basic service set (hereinafter referred to as 'BSS') 21 and 25. A BSS is a set consisting of an access point (hereinafter referred to as 'AP') and a station (STA) that are successfully synchronized and, thus, capable of communicating with each other. Herein, the BSS does not refer to a specific region (or area).

For example, a first BSS 21 may include a first AP 22 and one first STA 21-1. A second BSS 25 may include a second AP 26 and one or more STAs 25-1 and 25-2. Herein, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, APs 22 and 26 providing a distribution service, and a distribution system (DS) 27 connecting multiple APs.

The distribution system 27 may implement an extended service set (hereinafter referred to as 'ESS') 28, which is extended by being connected to multiple BSSs 21 and 25. The ESS 28 may be used as a term indicating one network that is configured by connecting one or more APs 22 and 26 through the distribution system 27. At least one AP being included in one ESS 28 may have a same service set identification (hereinafter referred to as SSID').

A portal 29 may perform the role of a bridge, which connects the wireless LAN network (IEEE 802.11) with another network (e.g., 802.X).

In a WLAN having the structure shown in (A) of FIG. 3, a network between the APs 22 and 26 and a network between the APs 22 and 26 and the STAs 21-1, 25-1, and 25-2 may be implemented.

Meanwhile, unlike the system shown in (A) of FIG. 3, the wireless data transceiving system 30 shown in (B) of FIG. 3 may be capable of performing communication by establishing a network between the STAs without any APs 22 and 26. A network that is capable of performing communication by establishing a network between the STAs without any APs 22 and 26 is defined as an Ad-Hoc network or an independent basic service set (hereinafter referred to as 'IBSS').

Referring to (B) of FIG. 3, the wireless data transceiving system 30 is a BSS that operates in the Ad-Hoc mode, i.e., an IBSS. Since the IBSS does not include any AP, a centralized management entity that performs a management function at the center does not exist. Therefore, in the wireless data transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All STAs 31-1, 31-2, 31-3, 32-4, and 32-5 included in the IBSS may be configured as mobile STAs and are not allowed to access a distributed system. All of the STAs included in the IBSS establish a self-contained network.

An STA that is mentioned in the present specification is a random functional medium including a medium access control (hereinafter referred to as 'MAC') and a physical layer interface for a wireless medium according to the regulations of the Institute of Electrical and Electronics Engineers (IEEE) 802.11 standard and may be used to broadly refer to both an AP and a non-AP STA.

An STA that is mentioned in the present specification may be referred to by using various terms, such a mobile terminal, a wireless device, a wireless transmit/receive unit (WTRU), a user equipment (UE), a mobile station (MS), a mobile subscriber unit, and, simply, a user.

Referring back to FIG. 2, a communication channel that is established by the communication units 1140 and 1210 may be a network communication channel. In this case, the communication units 1140 and 1210 may establish a tunneled direct link setup (TDLS) in order to avoid or reduce network congestion. Wi-Fi Direct and TDLS are used for setting up relatively short-range communication sessions. The communication channel that establishes a wireless link 11 may be a communication channel of a relatively short range or a communication channel that is implemented by using a physical channel structure, such as Wi-Fi using a variety of frequencies including 2.4 GHz, 3.6 GHz, 5 GHz, 60 GHz, or ultra-wideband (UWB), Bluetooth, and so on.

While techniques disclosed in the present specification may generally be described in relation with communication protocols, such as the IEEE 802.11 series standard, it will be apparent that aspects of such techniques may also be compatible with other communication protocols. Illustratively and non-restrictively, wireless communication between the communication units 1140 and 1210 may use orthogonal frequency-division multiplexing (OFDM) schemes. Other various wireless communication schemes including, but not limited to, time-division multiple access (TDMA), frequency-division multiple access (FDMA), code-division multiple access (CDMA), or any random combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing radio frequency signals. When an embodiment is implemented as software, the techniques described herein may be implemented as a module (e.g., a procedure, function, and so on) that performs the functions described in the present specification. The module may be stored in the memories 1120 and 1220 and may be executed by the processors 1130 and 1230. The memories 1120 and 1220 may be implemented inside the processors 1130 and 1230. Alternatively, the memories 1120 and 1220 may be implemented outside of the processors 1130 and 1230, and the memories 1120 and 1220 may be communicatively connected to the processors 1130 and 1230 via various well-known means that are disclosed in this technical field.

In light of the input/output of a data stream, the wireless data transmitting device 1100 may be referred to as a wireless source device that wirelessly provides a source, and the wireless data receiving device 1200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the wireless data transmitting device 1100 may be integrated to a form that configures part of a wireless set-top box, a wireless gaming console, a wireless digital video disc (DVD) player, a wireless router, or the like. In this case, the wireless data transmitting device 1100 may be provided as a wireless communication module or a chip. And, the wireless data receiving device 1200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video.

In this case, the wireless data receiving device 1200 may be provided in the form of a wireless communication module or chip.

The wireless data transmitting device 1100 and the wireless data receiving device 1200 may be integrated to forms that configure parts of a mobile device. For example, the wireless data transmitting device 1100 and the wireless data receiving device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the wireless data transmitting device 1100 and the wireless data receiving device 1200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

Figure 4:
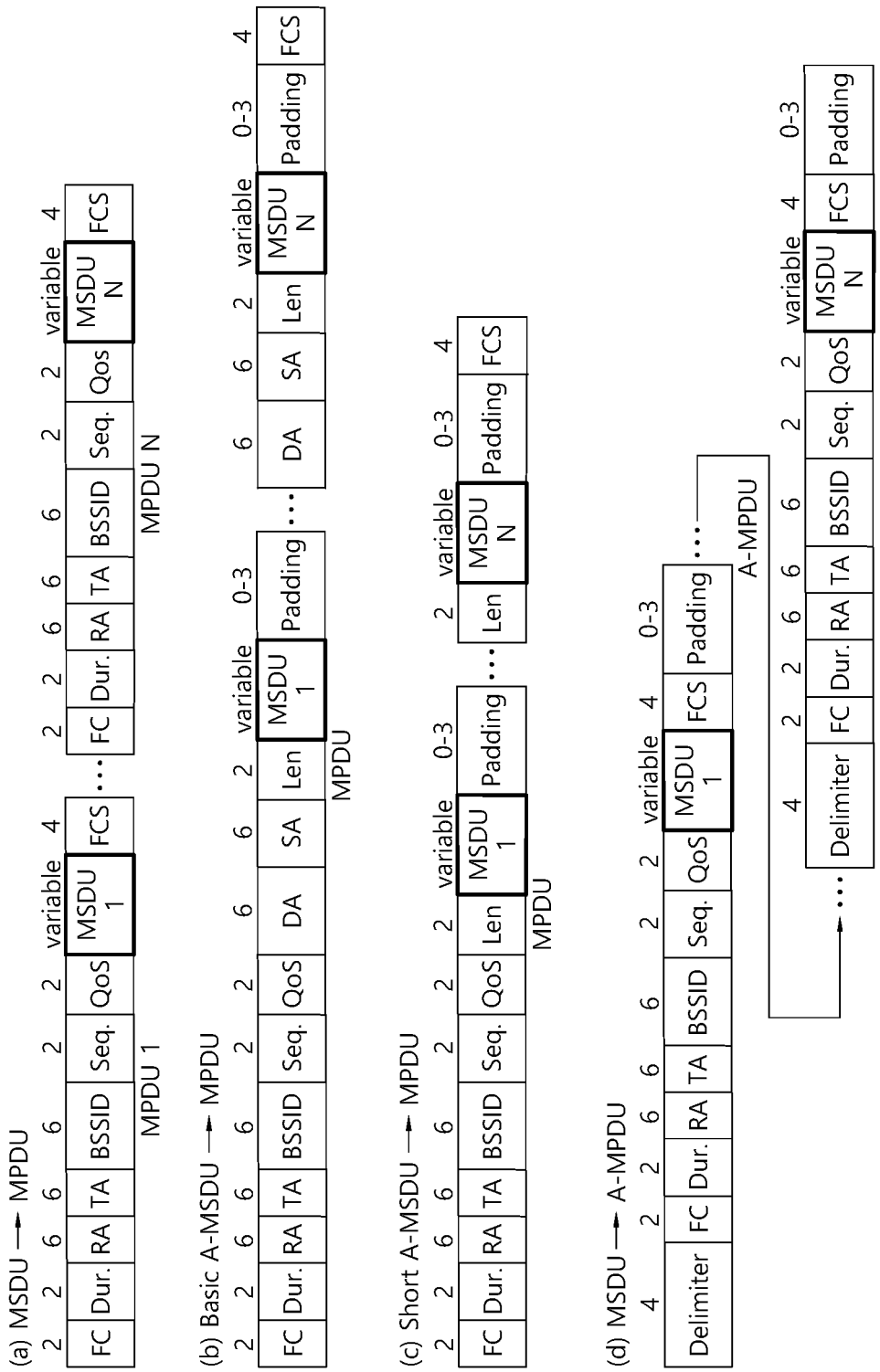
FIG. 4 is a diagram illustrating various MPDU frame formats used in the IEEE 802.11ad standard according to an example.

FIG. 4 is a diagram illustrating various MPDU frame formats used in the IEEE 802.11ad standard according to an example. A MAC protocol data unit (hereinafter MPDU) is a unit of data exchanged between two peer MAC layers or MAC entities. An MPDU frame may be simply called an MPDU or MAC data.

Referring to FIG. 4, the MAC layer receives a MAC service data unit (MSDU) from a higher layer. In addition, the MAC layer may generate various types of MPDU frames including a MAC header, a frame body, and a frame check sequence (FCS). In the MPDU frame, the MAC header, the frame body, and the FCS are sequentially arranged from left to right and are passed to a physical layer convergence procedure (PLCP) in this order.

The MAC header includes control information fields for transmission, control, or management of the MPDU frame.

The frame body is a data field provided for moving data of a higher layer and may include, for example, an MSDU or an MSDU fragment, a subheader, and a trailer. The subheader may be located at the front end of the MSDU or MSDU fragment, and the trailer may be located at the rear end of the MSDU or MSDU fragment. The frame body may be composed of a plurality of subframes.

The FCS is used for a receiver to check the integrity of a frame. All fields of the MAC header and the frame body may be included in the FCS, or a part (i.e., MSDU) of the frame body may be included in the FCS. The receiver may calculate the FCS from a received frame, compares the same with the FCS of the corresponding frame, and if the two match each other, determine that the frame has been normally received. The FCS may be referred to as a cyclic redundancy check (CRC).

As an example, the MPDU frame according to (a) of FIG. 4 indicates a general MPDU frame type including one MSDU for each MPDU. That is, MPDU 1 includes MSDU 1 and MPDU N includes MSDU N. The MPDU frame includes a MAC header at the front end of the frame body. The MAC header may include, for example, control information fields such as a frame control (FC) field, a duration (Dur.) field, a receiver address (RA) field, a transmitter address (TA) field, a BSSID field, a sequence (Seq.) field, and a quality of service (QoS) field.

The FC field is 2 bytes, is provided at the start position of the MAC header, and defines a protocol version and the type of the current MPDU frame (data frame, management frame, or control frame).

The duration field is 2 bytes, follows the frame control field, and indicates a time (in μs) that is expected to be used during transmission of the MPDU frame. The duration field may be used to set a network allocation vector (NAV), which is a value serving as a kind of medium use reservation timer.

The RA field is a MAC address identifier of an intended receiver with respect to the current MPDU frame or a MAC address identifier indicating which wireless device processes the current MPDU frame, and may be, for example, 6 bytes (48 bits). If a receiver address field indicates the address of an STA, the receiver address may be the same as a destination address. In some cases, a destination address (DA) field such as a client/server may be inserted instead of the RA field.

The TA field is a MAC address identifier of a transmitter that transmits the current MPDU frame and may be, for example, 6 bytes (48 bits). In some cases, a source address (SA) field such as a client/server may be inserted instead of the TA field.

The BSSID field is an ID for identifying a basic service set and may be, for example, 2 bytes.

The sequence field is used when a segmented MSDU is reassembled or a duplicate frame is discarded and may be, for example, 2 bytes. A higher layer frame (i.e. MSDU) is given a fragment number and a sequence number while being delivered to the MAC layer for transmission, and the sequence field indicates such a fragment number and/or sequence number.

As another example, the MPDU frame according to (b) and (c) of FIG. 4 indicates an MPDU frame type including a plurality of MSDUs in which MPDUs are aggregated. That is, a single MPDU frame includes a plurality of aggregated MSDUs 1, 2, . . . , N. MPDU frames of types (b) and (c) have one MAC header commonly applied to a plurality of MSDUs, and further include specific control information (hereinafter, MSDU-specific control information) for each MSDU.

For example, the MPDU frame of type (b) includes a MAC header (FC field, Dur. field, RA field, TA field, BSSID field, sequence field, QoS field) and MSDU specific control information (destination address (DA) field, a source address (SA) field, a length (Len) field, and padding). A set of MSDU-specific control information may be referred to as a subheader. Here, the DA field is control information indicating the destination address of the corresponding MSDU, the SA field is control information indicating the source address of the corresponding MSDU, and the length field is control information indicating the length of the corresponding MSDU. The padding is dummy control information that is added to an MSDU having a variable length to maintain the overall length constant.

Meanwhile, the MPDU frame of the type (c) includes a length field and padding as MSDU specific control information. The difference between the types (b) and (c) is presence or absence of the DA field and the SA field in the MSDU specific control information. Since the type (c) does not have the DA field and SA field as compared to the type (b), the type (b) may be called an MPDU frame based on basic A-MSDU and type (c) may be called an MPDU based on short A-MSDU.

The MPDU frame of the type (a) is generated in such a manner that a MAC header is added to each MSDU, whereas the MPDU frames of the types (b) and (c) are generated in such a manner that a single MAC header commonly applied to a plurality of aggregated MSDUs is added. Accordingly, at the time of transmitting the same number of MSDUs, control information fields with a smaller number of bits are transmitted when MPDU frames of the types (b) and (c) are used than when MPDU frames of the type (a) are used.

Finally, the MPDU frame of the type (d) is an aggregated MPDU (hereinafter, referred to as A-MPDU) frame, which is generated in such a manner that a delimiter field and padding are inserted between MPDUs of the type (a) and the MPDUs are combined.

Meanwhile, MPDU frames of the types (a) to (d) have different characteristics in terms of whether block ACK is supported and retransmission efficiency. For example, MPDU frames of the types (b) and (c) do not support block ACK, whereas MPDU frames of the type (d) may support block ACK.

The following table shows the number of bytes of control information fields inserted into MPDU frames of the types (a) to (d) and whether block ACK is supported.

TABLE 1

| MPDU frame type | MSDU type | Total control information field size when the number of MSDUs is N | Dummy for WAV 0.5 ms buffer case (1.54 MB) | Note |
| --- | --- | --- | --- | --- |
| (a) MPDU | MSDU | 30*N bytes | 30*1 = 30 bytes @ 1.5 MB Single MSDU | Ack is applicable, and retransmission efficiency decreases |
| (b) MPDU | Basic A-MSDU | 30 + 14*N bytes | 30 + 14*205 = 2,900 bytes @ 7920 MSDU Len | Block Ack is not supported |
| (c) MPDU | Short A-MSDU | 30 + 2*N bytes | 30 + 2*205 = 440 bytes @ 7920 MSDU Len | Block Ack is not supported |
| (d) A-MPDU | MSDU | 34*N bytes | 34*205 = 8,970 bytes @ 7920 MSDU Len | There are many dummies. Block Ack is supportable => retransmission efficiency increases |

Referring to Table 1, for example, in the case of an MPDU frame of the type (a), the number of bytes used as the control information fields is 30 bytes (2 bytes (FC field)+2 bytes (Dur. field)+6 byte (RA field)+6 bytes (TA field)+6 bytes (BSSID field)+2 bytes (sequence field)+2 bytes (QoS field)+4 bytes (FCS)) per MSDU. Therefore, when the MPDU frame of the type (a) is used to transmit N MSDUs, a total of 30*N bytes is used as the control information fields.

When the types (a) to (d) are compared, bandwidths occupied by the control information fields for the types are also different because the numbers of bits used as the control information field are different. Control information fields added other than the MSDU are essential for system management and control, but they are not user data and thus the more and larger the control information fields, the lower the actual user data transmission speed and throughput. On the other hand, when unnecessary control information fields are removed, the transmission speed and yield of actual user data can be improved.

For example, in most cases, applications of the wireless AV system to which the present disclosure pertains are based on 1:1 wireless communication (e.g., communication between a main body apparatus 100 and a display apparatus 200). That is, if the main body apparatus 100 is a wireless data transmission apparatus 1100, the display apparatus is a wireless data reception apparatus 1200, and if the display apparatus 200 is the wireless data transmission apparatus 1100, the main body apparatus 100 operates as the wireless data reception apparatus 1200. Such a wireless AV transmission environment provides a state in which the wireless data transmission apparatus 1100 and the reception apparatus 1200 are specified or fixed (i.e., a one-to-one connection state).

As described above, when the wireless data transmission apparatus 1100 and the reception apparatus 1200 are mutually specified or fixed, some MAC header information prepared for controlling a many-to-many connection or multiple access environment is unnecessary. That is, from the viewpoint of the transmission rate or yield of user data in the wireless AV system, a significant number of control information fields included in MPDU frames of the types (a) to (d) may be regarded as unnecessary overhead or dummy data that wastes a bandwidth. That is, the wireless AV system can operate even if the control information fields included in the MAC headers of MPDU frames of the types (a) to (3) are omitted or removed, which are not essential for the wireless AV system.

Accordingly, an embodiment of the present disclosure provides a method for designing a MAC frame and/or a PHY frame that improve the yield of a wireless AV system by reducing and/or minimizing overhead (or dummy data) of MAC data (i.e., MPDU) in the wireless AV system and apparatuses and methods for transmitting and/or receiving the MAC frame and/or the PHY frame.

Another embodiment of the present disclosure also provides a method for designing a MAC frame and/or a PHY frame for reducing data retransmission time/delay in a wireless AV system and apparatuses and methods for transmitting and/or receiving the MAC frame and/or the PHY frame. Since the wireless AV system has characteristics sensitive to time/delay, it is necessary to support block ACK during packet error recovery and retransmission. Accordingly, there is a need for a method for designing a MAC frame and/or a PHY frame capable of performing error recovery and retransmission in small data or segment units, and apparatuses and methods for transmitting and/or receiving the MAC frame and/or the PHY frame. An MPDU frame according to an example may provide an FCS in units of a segment or units of an MSDU based on the MPDU (i.e., A-MPDU) frame of the type (d).

In addition, another embodiment of the present disclosure provides a method for designing a MAC frame and/or a PHY frame providing backward compatibility in a wireless AV system and apparatuses and methods for transmitting and/or receiving the MAC frame and/or the PHY frame. The wireless AV system according to a third embodiment should not affect the operations of other devices (i.e., STAs or APs, hereinafter legacy stations) according to a short-range communication standard (e.g., IEEE 802.11 series) using the same unlicensed band.

An MPDU frame and a PPDU frame according to the present disclosure may be according to each of the above embodiments or a combination of two or more thereof. Hereinafter, the MPDU frame or the PPDU frame according to various embodiments of the present disclosure may be collectively referred to as a wireless AV data frame.

Figure 5:
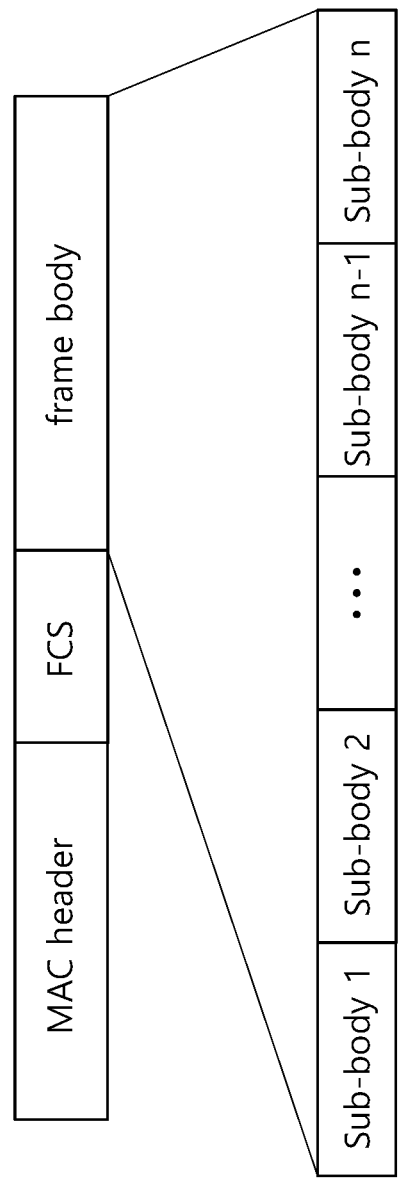
FIG. 5 is a block diagram illustrating a wireless data transmission/reception system according to another embodiment.
Figure 8:
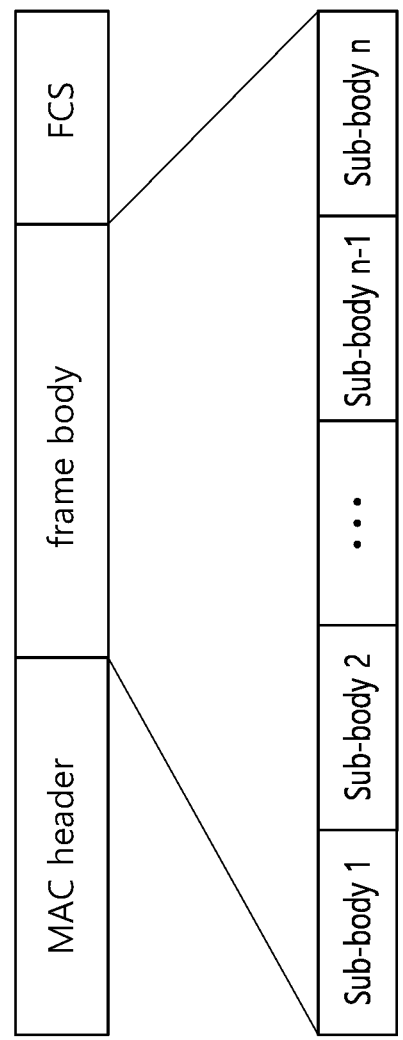
FIG. 8 illustrates an MPDU frame according to another embodiment.

First, MPDU frames are classified according to the location where an FCS regarding a MAC header is disposed, as shown in FIG. 5 and FIG. 8. FIG. 5 is an MPDU frame in which the FCS regarding the MAC header (or MPDU header) is disposed at the end of the MAC header and FIG. 8 is an MPDU frame in which the FCS regarding the MAC header (or MPDU header) is disposed at the end of the MPDU frame.

FIG. 5 illustrates an MPDU frame according to an embodiment.

Referring to FIG. 5, the MPDU frame includes a MAC header, an FCS regarding the MAC header, and a frame body. The frame body may include a plurality of sub-bodies (sub-body 1, sub-body 2, . . . , sub-body n−1, and sub-body n).

Figure 6:
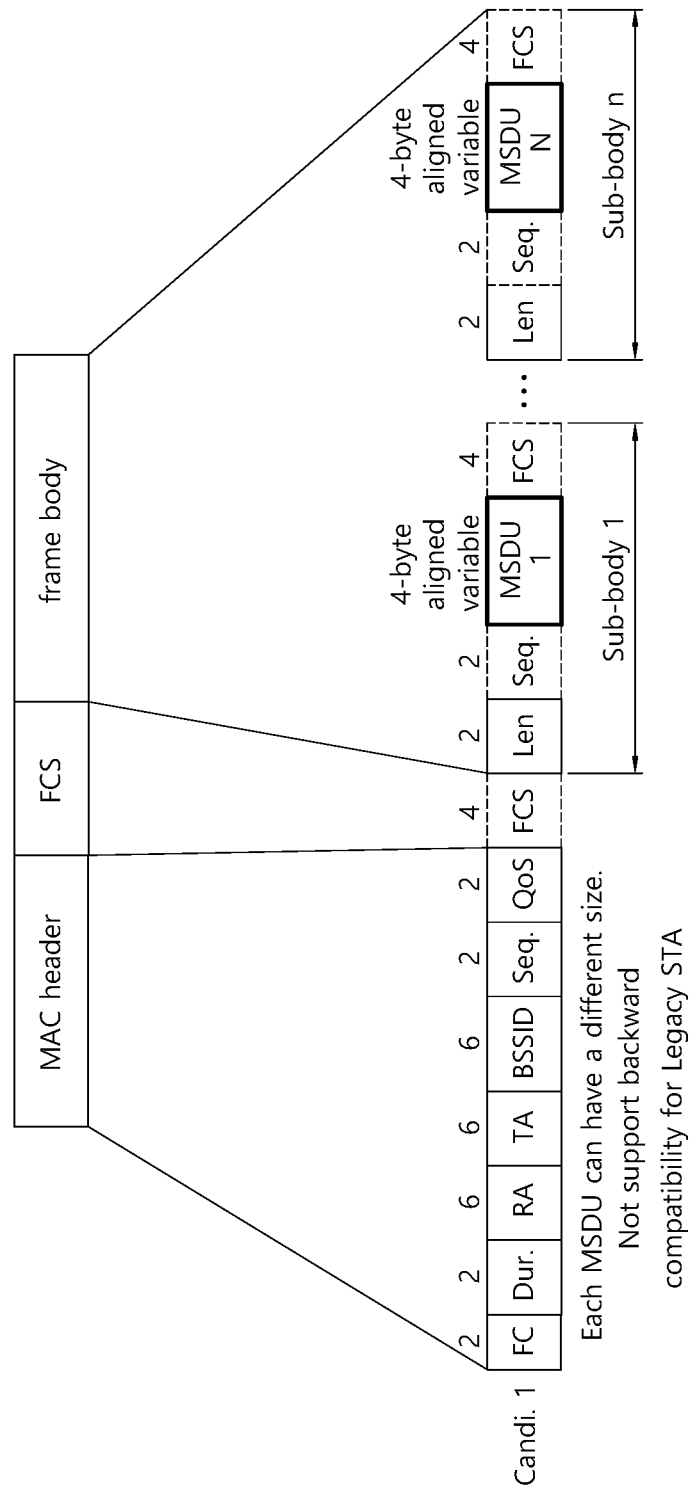
FIG. 6 is an exemplary MPDU frame structure based on FIG. 5.
Figure 7:
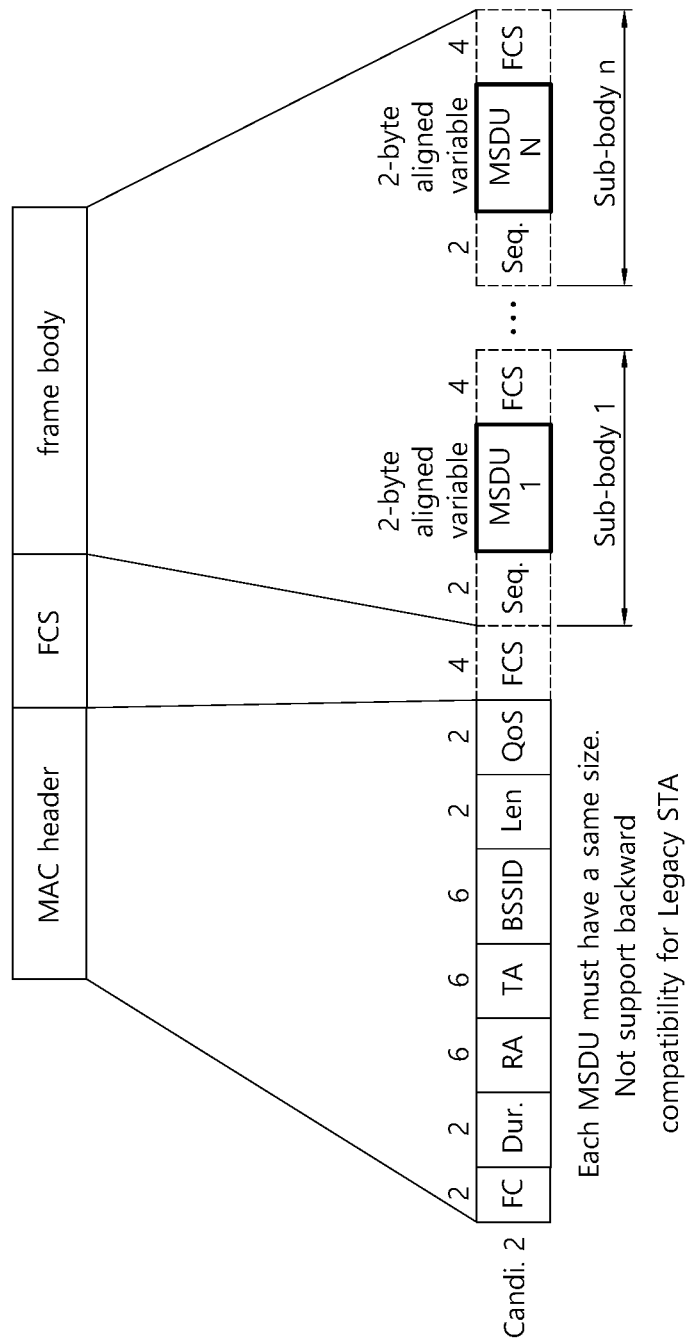
FIG. 7 is another exemplary MPDU frame structure based on FIG. 5.

The MPDU frame of FIG. 5 may have the same structure as that in FIG. 6 to FIG. 8 depending on how the MAC header and the frame body are configured.

FIG. 6 is an exemplary MPDU frame structure based on FIG. 5.

Referring to FIG. 6, a first candidate (Candi.1) MPDU frame includes a MAC header and a frame body. The MAC header includes an FC field, a duration field, an RA field, a TA field, a BSSI field, a sequence field, a QoS field, and an FCS regarding the MAC header sequentially from the left on which the MAC header starts to the right. Here, the size of each control information field included in the MAC header may be the aforementioned number of bytes of each control information field of FIG. 6.

The frame body includes a plurality of sub-bodies (sub-body 1, . . . , sub-body n). Here, each sub-body includes a length (len) field indicating the length of an MSDU included in the corresponding sub-body, a sequence field indicating the sequence of the corresponding sub-body (or MSDU), an MSDU, and an FCS regarding the corresponding sub-body sequentially from the left on which the corresponding sub-body starts to the right. The size of each control information field included in the sub-body may be the aforementioned number of bytes of each control information field of FIG. 6. For example, the MSDU is aligned or disposed after 4 bytes (2 bytes of the length field+2 bytes of the sequence field) from the beginning of each sub-body. The size of the MSDU may be independently determined by the length field of each sub-body, and the MSDUs of the sub-bodies may have the same size or different sizes.

Since the FCS is attached to each sub-body (or each MSDU), the first candidate MPDU frame can support error checking (i.e., block ACK or a method similar to block ACK) in units of a segment (i.e., MSDU).

FIG. 7 is another exemplary MPDU frame structure based on FIG. 5

Referring to FIG. 7, a second candidate (Candi.2) MPDU frame includes a MAC header and a frame body. The MAC header includes an FC field, a duration field, an RA field, a TA field, a BSSI field, a length (len) field, a QoS field, and an FCS regarding the MAC header sequentially from the left on which the MAC header starts to right. Here, the size of each control information field included in the MAC header may be the aforementioned number of bytes of each control information field of FIG. 7.

The length field indicates the size of the MSDU in each sub-body disposed following the MAC header. When the second candidate MPDU frame is compared with the first candidate MPDU frame, the sequence field of the MAC header is replaced with the length field, and each sub-body does not include the length field. That is, the MAC header includes the length field and each sub-body does not include the length field. Accordingly, there is a constraint that the sizes of all MSDUs are set to be equal by one length field included in the MAC header, whereas the length field of 2 bytes is omitted in each sub-body, and thus 2(n−1) bytes can be saved. By allocating the number of bytes saved by removing the length field to user data MSDU, it is possible to increase the transmission yield of the user data.

Since the FCS is attached to each sub-body (or each MSDU), the first candidate MPDU frame can support error checking (i.e., block ACK or a method similar to block ACK) in units of a segment (i.e., MSDU).

Meanwhile, the size of each control information field in each sub-body may be the aforementioned number of bytes of each control information field of FIG. 7. For example, the MSDU is aligned or disposed after 2 bytes (sequence field) from the beginning of each sub-body.

FIG. 8 illustrates an MPDU frame according to another embodiment. Unlike FIG. 5, this is an MPDU frame including an FCS regarding the MAC header at the end of the MPDU frame.

Referring to FIG. 8, the MPDU frame includes a MAC header, a frame body, and an FCS regarding the MPDU frame. The frame body may include a plurality of sub-bodies (sub-body 1, sub-body 2, . . . , sub-body n−1, and sub-body n).

Figure 9:
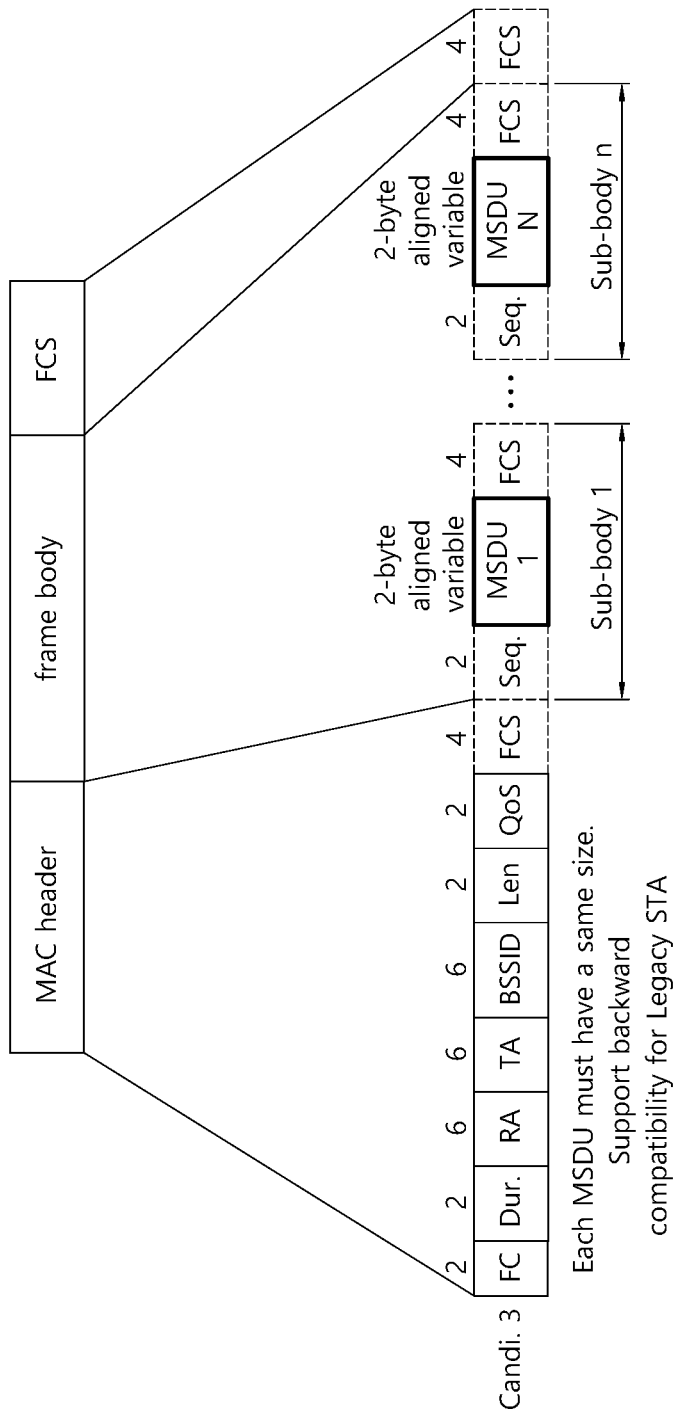
FIG. 9 is an exemplary MPDU frame structure based on FIG. 8.
Figure 10:
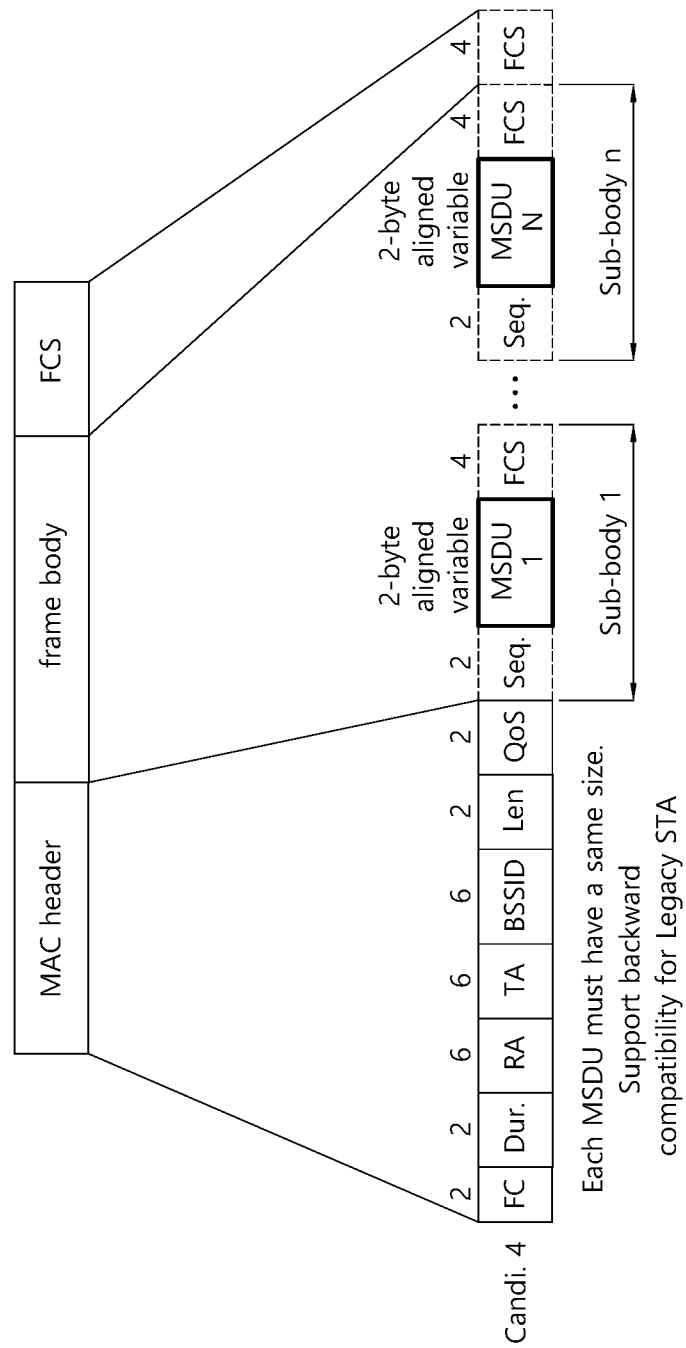
FIG. 10 is another exemplary MPDU frame structure based on FIG. 8.

The MPDU frame of FIG. 8 may have the same structure as that in FIG. 9 and FIG. 10 according to how the MAC header and the frame body are configured.

FIG. 9 is an exemplary MPDU frame structure based on FIG. 8.

Referring to FIG. 9, a third candidate (Candi.3) MPDU frame includes a MAC header, a frame body, and an FCS regarding the MAC header. The MAC header includes an FC field, a duration field, an RA field, a TA field, a BSSI field, a length (len) field, a QoS field, and an FCS regarding the MAC header sequentially from the left on which the MAC header starts to the right. Here, the size of each control information field included in the MAC header may be the aforementioned number of bytes of each control information field of FIG. 9.

The length field indicates the size of the MSDU in each sub-body disposed following the MAC header. Accordingly, there is a constraint that the sizes of all MSDUs are set to be equal by one length field included in the MAC header, whereas the length field of 2 bytes is omitted in each sub-body, and thus 2(n−1) bytes can saved. By allocating the number of bytes saved by removing the length field to user data MSDU, it is possible to increase the transmission yield of the user data.

Since the FCS is attached to each sub-body (or each MSDU), the first candidate MPDU frame can support error checking (i.e., block ACK or a method similar to block ACK) in units of a segment (i.e., MSDU).

Meanwhile, the size of each control information field in each sub-body may be the aforementioned number of bytes of each control information field of FIG. 9. For example, the MSDU is aligned or disposed after 2 bytes (sequence field) from the beginning of each sub-body.

FIG. 10 is another exemplary MPDU frame structure based on FIG. 8.

Referring to FIG. 10, a fourth candidate (Candi.4) MPDU frame includes a MAC header, a frame body, and an FCS regarding the MAC header. The MAC header includes an FC field, a duration field, an RA field, a TA field, a BSSI field, a length (len) field, and a QoS field sequentially from the left on which the MAC header starts to the right. Here, the size of each control information fields included in the MAC header may be the aforementioned number of bytes of each control information field of FIG. 10.

When the fourth candidate MPDU frame is compared with the third candidate MPDU frame, the FCS in the MAC header is removed.

Since the FCS is attached to each sub-body (or each MSDU), the first candidate MPDU frame can support error checking (i.e., block ACK or a method similar to block ACK) in units of a segment (i.e. MSDU).

Meanwhile, the size of each control information field in each sub-body may be the aforementioned number of bytes described each control information field of FIG. 10. For example, the MSDU is aligned or disposed after 2 bytes (sequence field) from the beginning of each sub-body.

Table 2 shows the performance of the first to fourth candidate MPDU frames in terms of whether block ACK is supported, backward compatibility with legacy stations, and increase or decrease in the number of bits.

included in the corresponding MPDU may be treated as OK. If the CRC of the FCS regarding the MAC header is NOK (not OK), the CRCs of all MSDUs included in the corresponding MPDU may be treated as NOK. In this case, OK or NOK for each MSDU may be ignored by the CRC of the FCS regarding each MSDU.

As another example, retransmission may be performed based on OK or NOK by the CRC of the FCS for each MSDU. For example, even in the case of OK according to the CRC of the FCS for the MAC header, if a CRC of an FCS for a specific MSDU is NOK, retransmission of the specific MSDU may be performed. Further, even in the case of OK according to the CRC of the FCS for the MAC header, if a CRC of an FCS for a specific MSDU is NOK, retransmission of the specific MSDU may be performed.

The first to fourth candidate MPDU frames disclosed in FIGS. 6, 7, 9 and 10 are MPDU frames designed based on the A-MSDU. Hereinafter, an A-MPDU frame designed based on the MSDU will be disclosed.

Figure 11:
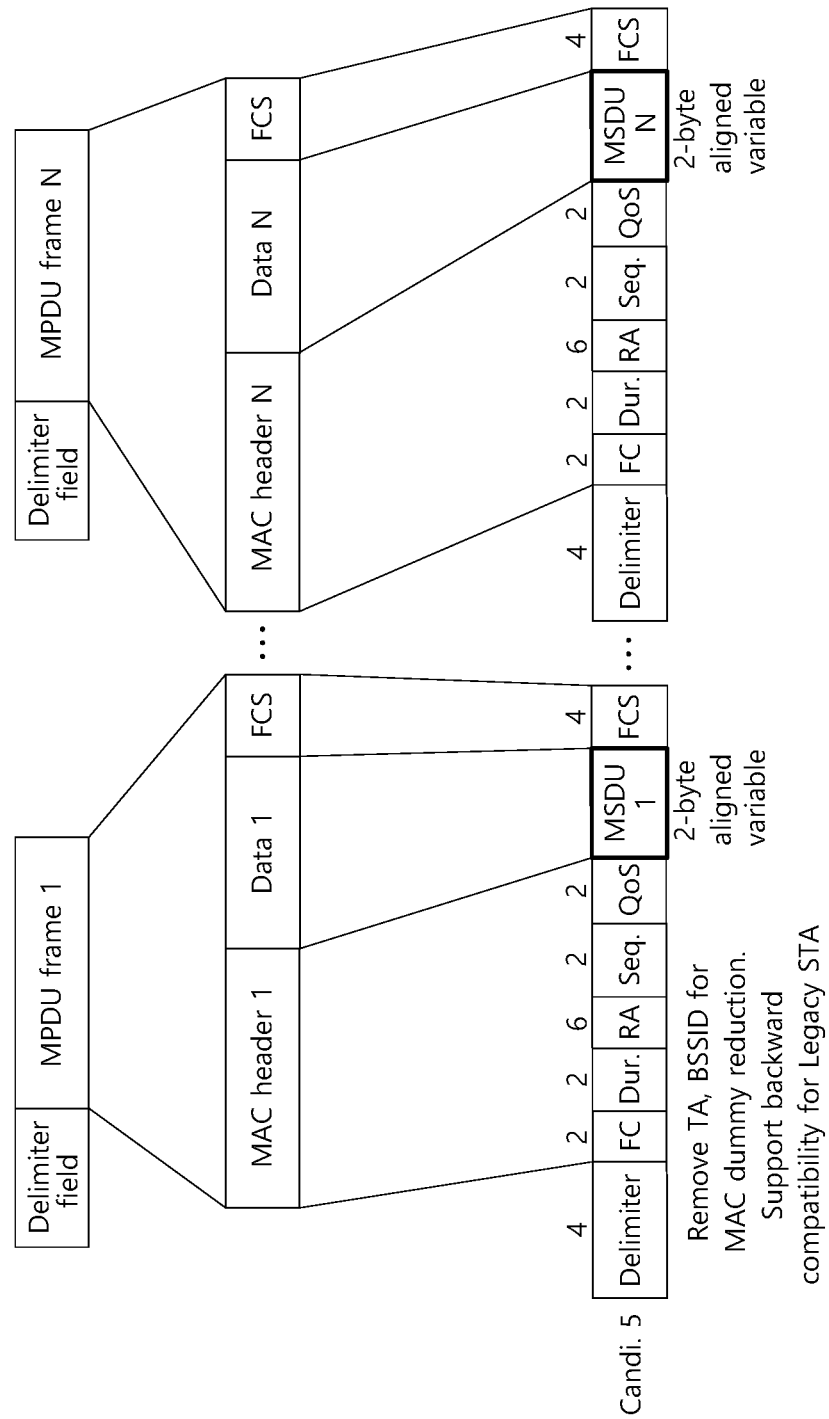
FIG. 11 illustrates an MPDU frame according to another embodiment, which is an A-MPDU frame.

FIG. 11 illustrates an MPDU frame according to another embodiment. This is an A-MPDU frame.

Referring to FIG. 11, a fifth candidate (Candi.5) MPDU frame is an A-MPDU frame, which is an aggregation of a plurality of MPDU frames MPDU 1, MPDU 2, . . . , MPDU N. That is, the fifth candidate MPDU frame is generated by inserting delimiter fields between MPDU frames and combining the MPDU frames.

Each MPDU frame of the fifth candidate MPDU frame includes a MAC header N, data N, and an FCS regarding the MAC header. Since the FCS regarding the MAC header is

TABLE 2

| MPDU frame type | Whether block Ack is supported | Backward compatibility | Total control information field size when the number of MSDUs is N | Dummy for 0.5 ms Buf. (1.54 MB) @ 7920 bytes MSDU Len |
|---|---|---|---|---|
| Conventional A-MSDU | No | Yes | 30 + 2*N bytes | 30 + 2*205 = 440 bytes |
| First candidate MPDU frame | Yes | No | 30 + 8*N bytes | 30 + 8*205 = 1,670 bytes |
| Second candidate MPDU frame | Yes | No | 30 + 6*N bytes | 30 + 6*205 = 1,260 bytes |
| Third candidate MPDU frame | Yes | Yes | 34 + 6*N bytes | 34 + 6*205 = 1,264 bytes |
| Fourth candidate MPDU frame | Yes | Yes | 30 + 6*N bytes | 30 + 6*205 = 1,260 bytes |

Referring to Table 2, since the FCS is added to each sub-body in the first to fourth candidate MPDU frames, error checking (or block ACK) in units of small data (or in units of a segment unit or MSDU) is possible. However, since a 4-byte FCS is added to each sub-body to support block ACK, the number of bits may be increased as compared to an MPDU frame based on the conventional A-MSDU. Meanwhile, the first and second candidate MPDU frames do not include the FCS at the end of the MPDU frame and thus have difficulty supporting backward compatibility with legacy stations, whereas the third and fourth candidate MPDU frames include the FCS at the end of the MPDU frame and thus can support backward compatibility with legacy stations.

In the third and fourth candidate MPDU frames, an error checking (i.e., CRC) method using the FCS regarding the MAC header is as follows.

As an example, if a cyclic redundancy check (CRC) of the FCS regarding the MAC header is OK, CRCs of all MSDUs already included in each MPDU frame, error detection (i.e., block ACK) can be performed in small data units (or segment units) in the A-MPDU frame. Segment-based error detection is essential to reduce data retransmission time/delay in the wireless AV system. Unlike the first to fourth candidate MPDU frames, it is not necessary for the fifth candidate MPDU frame to add an additional FCS to support block ACK.

The A-MPDU frame includes a MAC header for every MPDU frame, which causes an increase in overhead. Accordingly, the fifth candidate MPDU frame provides a MAC header for reducing the number of bits of a control information field of the MAC header as well as block ACK.

In reducing or removing the number of bits of the control information field in the MAC header, the MAC header or the MPDU frame according to the present embodiment includes or maintains control information fields essential for a specific application. On the other hand, the MAC header or the MPDU frame according to the present embodiment does not include a control information field that is not essential for a specific application.

Hereinafter, the present disclosure provides a criterion for discriminating between a control information field essential for a wireless AV system and a control information field that is not. However, the technical spirit of the present disclosure does not limit a specific application to the wireless AV system.

A wireless AV system is based on a one-to-one service set or personal basic service set (PBSS) due to characteristics of applications. That is, the wireless AV system is in a state in which a wireless data transmitter and receiver are specified, or in a state in which the transmitter and the receiver already mutually know.

Accordingly, a control information field for identification of the transmitter or the receiver can be implicitly known to the transmitter and the receiver even if it is not informed by an explicit signal. For example, in a wireless AV transmission environment, the wireless data transmission apparatus 1100 may be implicitly specified even if a transmitter address is not notified as an explicit signal. That is, in the wireless AV system, a transmitter address field is not an essential element but an optional element.

From the same point of view, a receiver address field may also be implicitly specified in a wireless AV transmission environment, and thus may be omitted. However, since the MPDU frame in which the receiver address field is omitted is also transmitted to other devices (hereinafter referred to as legacy STAs) conforming to the IEEE 802.11 standards, it may cause malfunction of decoding of legacy stations. Therefore, in order to secure backward compatibility with legacy stations, it is desirable that the receiver address field is not omitted.

In addition, a BSSID is an identifier for distinguishing between different BSSs in a network, and the advantage of using the BSSID is filtering. Different networks may overlap either physically or in coverage, and data transmissions occurring in different networks overlapping in this manner do not need to be received. Since the wireless AV system is based on a one-to-one service set or PBSS due to characteristics of applications, the BSSID field in the wireless AV system is not an essential element but an optional element.

However, in omitting non-essential elements in the MAC header in the wireless AV system, backward compatibility with legacy stations must be satisfied.

As an example, fields up to the first address (address1) information field of the MAC header may not be changed and fields subsequent to the first address information field may be omitted to reduce the MAC header. Accordingly, backward compatibility with IEEE 802.11ad or ay standards can be maintained.

As described above, the fifth candidate MPDU frame in which the MAC header is reduced in consideration of backward compatibility with legacy stations will be described in detail as follows.

The MAC header of the fifth candidate MPDU frame includes an FC field, a duration, an RA field, a sequence field, and a QoS field sequentially from the left on which the MAC header starts to the right.

The MAC header of the first to fourth candidate MPDU frames includes a plurality of address fields (RA field and TA field), whereas the MAC header of the fifth candidate MPDU frame includes a single address field (i.e., RA field). That is, the MAC header of the fifth candidate MPDU frame is a MAC header in which the TA field is omitted or removed. The fifth candidate MPDU frame includes the RA field such that legacy stations can read at least fields up to the RA field. Accordingly, the fifth candidate MPDU frame can provide backward compatibility with legacy stations.

In addition, the MAC header of the first to fourth candidate MPDU frames includes the BSSID field, whereas the MAC header of the fifth candidate MPDU frame does not include the BSSID field.

Here, the size of each control information field included in the MAC header may be the above-described number of bytes of each control information field of FIG. 11.

Comparing the fifth candidate MPDU frame with the A-MPDU frame of FIG. 4(*d*), the MAC header of the fifth candidate MPDU frame is 22 bytes, and the MAC header of the A-MPDU frame of FIG. 4(*d*) is 34 is bytes. That is, the MAC header of the fifth candidate MPDU frame is reduced by 12 bytes as compared to the MAC header of the general A-MPDU frame. By minimizing MAC overhead (or dummy) in this manner, the effect of improving the transmission rate is obtained. For example, when a 6QAM and 7/8 code rate are assumed, a data rate may be improved to a level of 7.5 Mbps.

First to fifth MPDU frames may be generated by the wireless data transmission apparatus 1100. Specifically, the processor 1130 of the wireless data transmission apparatus 1100 may generate the first to fifth MPDU frames, and the communication unit 1140 of the wireless data transmission apparatus 1100 may transmit the generated MPDU frames to the communication unit 1210 of the wireless data reception apparatus 1200. In this case, the communication unit 1210 of the wireless data reception apparatus 1200 receives the MPDU frames and the processor 1230 of the wireless data reception apparatus 1200 decodes and reads the MPDU frames.

The first to fifth MPDU frames may be generated by the wireless data reception apparatus 1200. Specifically, the processor 1230 of the wireless data reception apparatus 1200 may generate the first to fifth MPDU frames, and the communication unit 1210 of the wireless data reception apparatus 1200 may transmit the generated MPDU frames to the communication unit 1140 of the wireless data transmission apparatus 1100. In this case, the communication unit 1210 of the wireless data transmission apparatus 1100 receives the MPDU frames, and the processor 1130 of the wireless data transmission apparatus 1100 decodes and reads the MPDU frames.

FIG. 12 is an example of results of simulation for comparing the performances of various MPDU frames.

Referring to FIG. 12, TRX times of the MPDU frames of FIGS. 4 (*a*), (*d*), and (*c*) corresponding to the legacy MPDU frame, the second candidate MPDU frame, and the fifth candidate MPDU frame are compared (upper table) and MAC dummies thereof are compared (lower table).

Hereinafter, a method for mapping the MPDU frame according to FIGS. 5 to 11 to a physical layer in order to transmit the MPDU frame and a transmission method are disclosed.

A procedure for transmitting the MPDU frame as shown in FIGS. 5 to 11 at a transmitting side that intends to transmit the MPDU frame includes a step in which a MAC layer of the transmitting side generates the MPDU frame, a step in which the MAC layer of the transmitting side provides the MPDU frame as a physical service data unit (PSDU) to a physical layer that is a lower layer, a step in which the physical layer of the transmitting side generates a physical protocol data unit (PPDU) frame including the PSDU, and step in which the physical layer of the transmitting side transmits the PPDU frame to the physical layer of a receiving side.

A procedure for receiving the MPDU frame as shown in FIGS. 5 to 11 at a receiving side that intends to receive the MPDU frame includes a step in which a physical layer of the receiving side receives a PPDU frame from a physical layer of a transmitting side, a step in which the physical layer of the receiving side provides a PSDU to a MAC layer of the receiving side, and a step in which the MAC layer of the receiving side extracts the MPDU frame from the PSDU.

In this specification, a source is defined as the wireless data transmission apparatus 1100 and a sink is defined as the wireless data reception apparatus 1200 based on a direction in which user data such as an image signal and a sound signal is transmitted. However, data communication according to the present embodiment is based on two-way communication, and since the sink can transmit an MPDU or a PPDU required for control or management to the source, the transmitting side and the receiving side can be reversed. Accordingly, the present disclosure pertains to both a case where the transmitting side is the wireless data transmission apparatus 1100 and the receiving side is the wireless data reception apparatus 1200 and a case where the transmitting side is the wireless data reception apparatus 1200 and the receiving side is the wireless data transmission apparatus 1100.

Meanwhile, the physical layer may generate a PPDU or aggregate individual PPDUs to generate an aggregated PPDU (A-PPDU). That is, the wireless data transmission apparatus 1100 or the wireless data reception apparatus 1200 may generate a PPDU or aggregate individual PPDUs to generate an A-PPDU.

Figure 13:
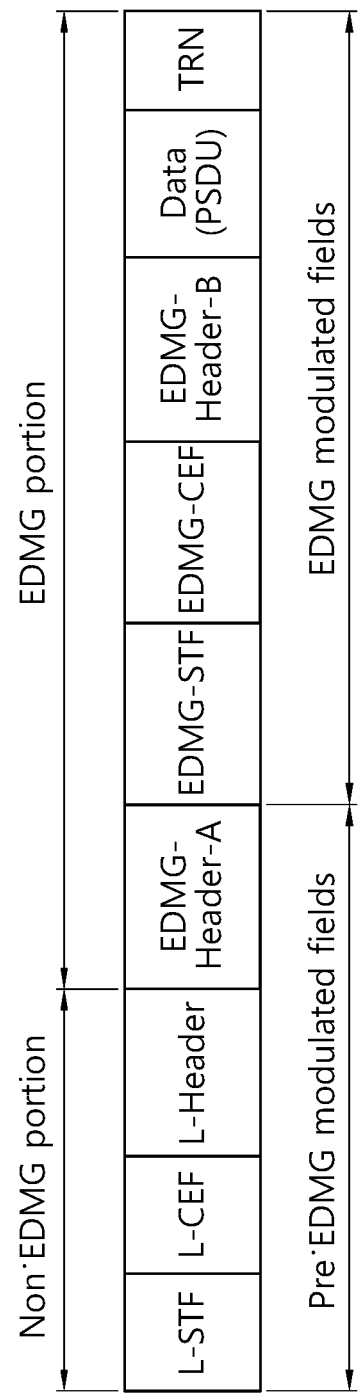
FIG. 13 is a PPDU frame of a physical layer to which an MPDU frame according to an example can be mapped.

FIG. 13 is a PPDU frame of a physical layer to which an MPDU frame may be mapped according to an example. This is a general PPDU frame.

Referring to FIG. 13, when the PPDU frame is represented in a logical bit level, it may include an L-STF (legacy-short training field), an L-CEF (legacy-channel estimation field), an L-header (legacy-header), EDMG-header A (enhanced directional multi-gigabit-header A), an EDMG-STF, an EDMG-CEF, EDMG-header B, data, and TRN, and these fields may be optionally included according to PPDU type (e.g., SU PPDU, MU PPDU, etc.). The L-STF includes a training signal. The L-header may include control information for a first legacy station (e.g., a station supporting IEEE802.11ad), the EDMG-header may include control information for a second legacy station (e.g., a station supporting IEEE802.1 lay), and the EDMG-STF may include a training signal for the second legacy station.

Here, the control information fields (L-STF, L-CEF, L-header, EDMG header A, EDMG-STF, EDMG-CEF, and EDMG-header B) of the physical layer added to the front end of data can be collectively called a preamble. Further, a portion including the L-STF, L-CEF, and L-header fields may be referred to as a non-EDMG portion, and the remaining portion may be referred to as an EDMG portion. In addition, the L-STF, L-CEF, L-Header, and EDMG-Header-A fields may be referred to as pre-EDMG modulated fields, and the remaining portion may be referred to as EDMG modulated fields.

Meanwhile, the structure of the PPDU frame shown in FIG. 13 is merely an example and may be provided in a different form.

Figure 14A:
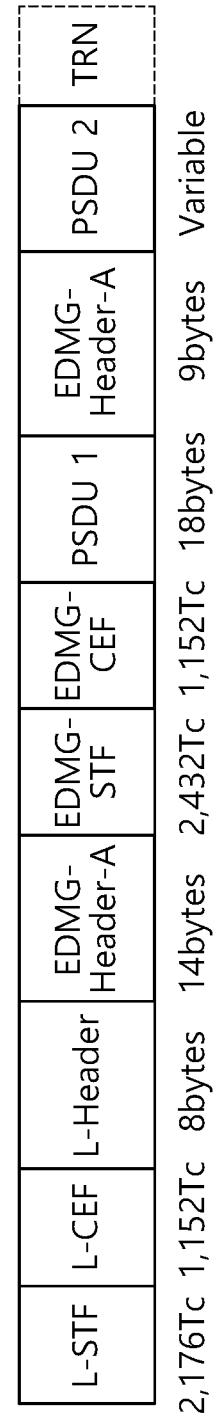
FIGS. 14a and 14b are PDU frames of a physical layer to which an MPDU frame according to another example can be mapped, which are A-PPDU frames.
Figure 14B:
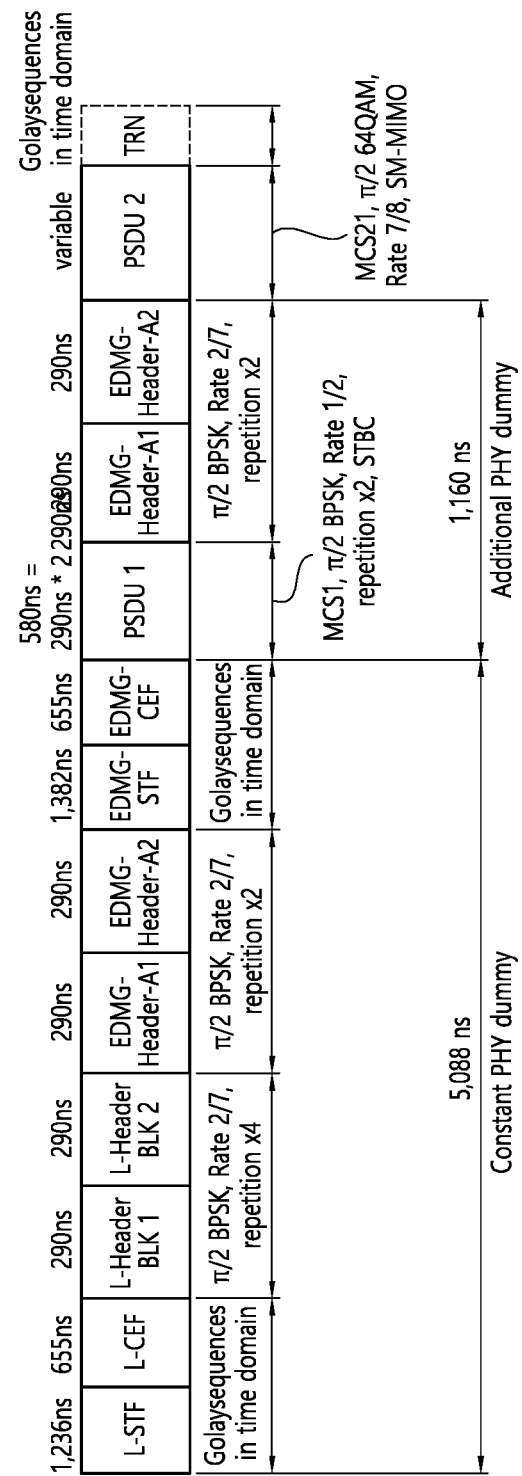

FIG. 14a and FIG. 14b show a PPDU frame of a physical layer to which the MPDU frame may be mapped according to another example. This is an A-PPDU frame.

Referring to FIG. 14a, when the A-PPDU frame is represented in a logical bit level, it may include an L-STF, an L-CEF, an L-header, EDMG-header A, an EDMG-STF, an EDMG-STF, PSDU 1, EDMG-header A, PSDU 2, and TRN. These fields may be optionally included according to PPDU type (e.g., SU PPDU, MU PPDU, etc.). The L-STF may include a training signal. The L-header may include control information for a first legacy station (e.g., a station supporting IEEE802.11ad), the EDMG-header may include control information for a second legacy station (e.g., a station supporting IEEE802.11ay), and the EDMG-STF may include a training signal for the second legacy station.

Referring to FIG. 14b, each field of the A-PPDU frame may be transmitted during the illustrated time interval. The L-header includes L-header block 1 and L-header block 2, and EDMG-header A includes EDMG-header A1 and EDMG-header A2.

Figure 15A:
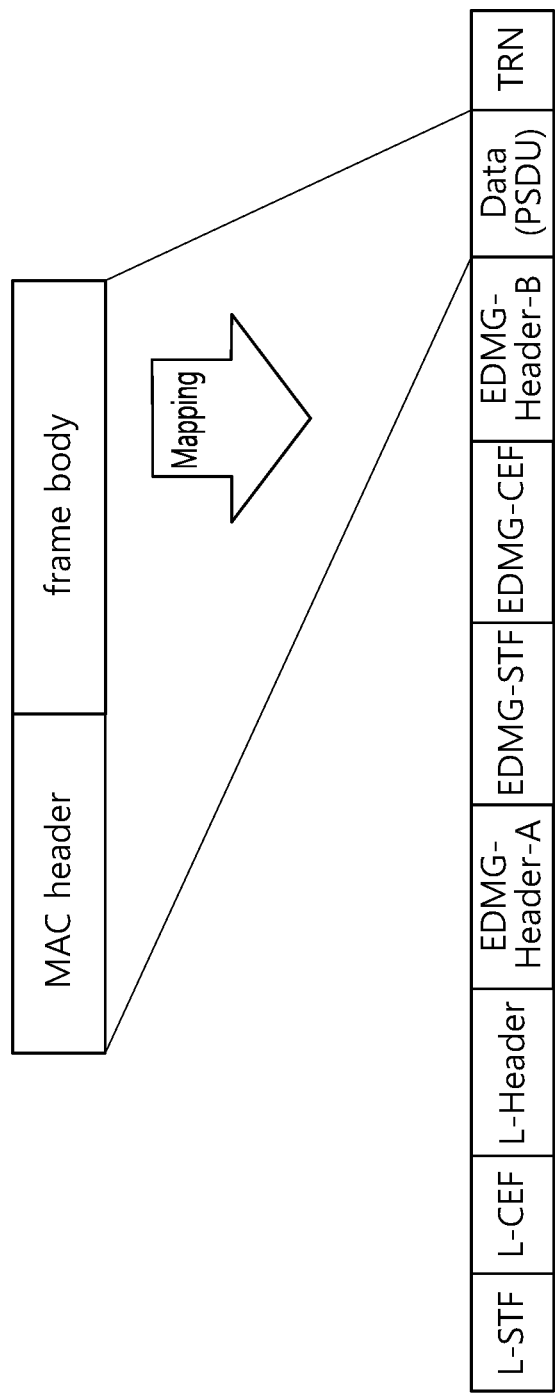
FIG. 15a is an example in which an MPDU frame is mapped to a PPDU frame.

FIG. 15a is an example in which an MPDU frame is mapped to a PPDU frame. Specifically, FIG. 15a shows that the MPDU frame according to FIG. 5 is mapped to the PPDU frame.

Referring to FIG. 15a, the second candidate MPDU frame may be all carried on (i.e., mapped to) the data region of the PPDU as a PSDU. The MPDU frame of FIG. 8 and the first to fifth candidate MPDU frames may be mapped to the A-PPDU frame of FIG. 15a as well as the MPDU frame of FIG. 5.

Figure 15B:
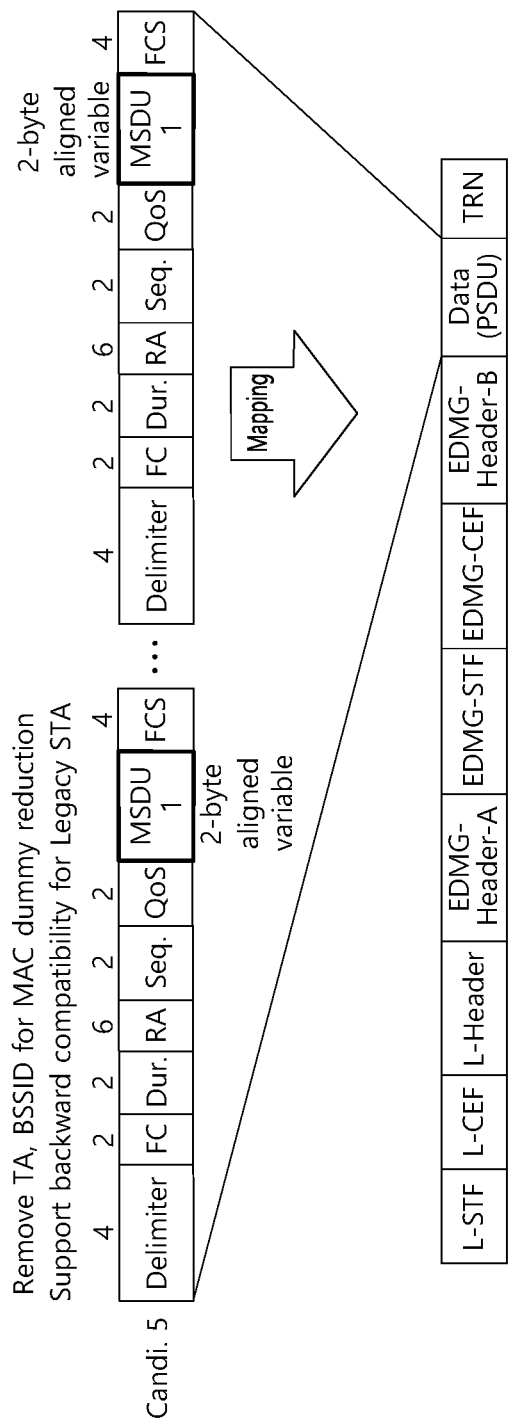
FIG. 15b is another example in which an MPDU frame is mapped to a PPDU frame.

FIG. 15b is another example in which an MPDU frame is mapped to a PPDU frame. Specifically, FIG. 15b shows that the fifth candidate MPDU frame is mapped to the PPDU frame.

Referring to 15b, the MAC layer of the transmitting side generates the fifth candidate MPDU frame and transmits the same to the physical layer of the transmitting side, and the physical layer of the transmitting side maps the fifth candidate MPDU frame to the data region of the PPDU frame as a PSDU. At this time, the physical layer of the transmitting side sequentially adds L-STF, L-CEF, L-header, EDMG-header A, EDMG-STF, EDMG-CEF, and EDMG-header B to the front end of the data region and adds the TRN field to the rear end of the data region to generate a PPDU frame. The physical layer of the transmitting side transmits the generated PPDU frame to the receiving side.

On the other hand, the physical layer of the receiving side that has received the PPDU frame interprets the PPDU frame based on the preamble of the PPDU frame, extracts and decodes the data region to obtain the PSDU, and delivers the obtained PSDU to the MAC layer. The MAC layer obtains the fifth candidate MPDU frame from the PSDU and interprets the MPDU frame based on the MAC header of the fifth candidate MPDU frame. Specifically, the MAC layer sequentially decodes the FC field, the duration field, and the RA field included in the MAC header and checks whether the corresponding MPDU frame is an MPDU frame intended therefor from the RA field. When the address indicated by the RA field is the same as the receiving side address, it can be confirmed that the corresponding MPDU frame is an MPDU frame intended for the receiving side. If it is confirmed that the MPDU frame is intended for the receiving side in this manner, the MSDU of the frame body is obtained based on the sequence field and the QoS field. The MAC layer of the receiving side checks whether there is a transmission error in the corresponding MPDU frame based on the FCS, and if it is determined that there is no transmission error, delivers the corresponding MSDU to a higher layer.

In the embodiment of FIG. 15b, when the transmitting side is the wireless data transmission apparatus 1100 and the receiving side is the wireless data reception apparatus 1200, the operations of the MAC layer and the physical layer of the transmitting side may be performed by the communication unit 1140 of the wireless data transmission apparatus 1100, and the operations of the MAC layer and the physical layer of the receiving side may be performed by the communication unit 1210 of the wireless data reception apparatus 1200. On the other hand, in the embodiment of FIG. 15b, when the transmitting side is the wireless data reception apparatus 1200 and the receiving side is the wireless data transmission apparatus 1100, the operations of the MAC layer and the physical layer of the transmitting side may be performed by the communication unit 1210 of the wireless data reception apparatus 1200 and the operations of the MAC layer and the physical layer of the receiving side may be performed by the communication unit 1210 of 1200, and may be performed by the communication unit 1140 of the wireless data transmission apparatus 1100.

Figure 16:
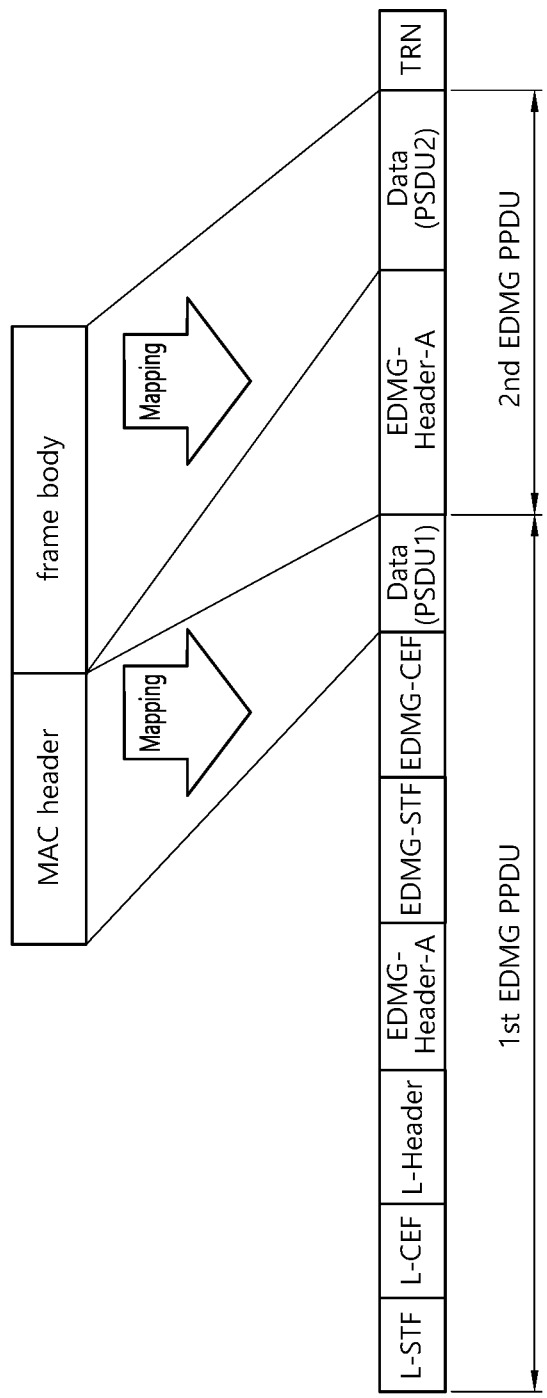
FIG. 16 is an example in which an MPDU frame is mapped to an A-PPDU frame.

FIG. 16 is an example in which an MPDU frame is mapped to an A-PPDU frame. Specifically, FIG. 16 shows that the MPDU frame according to FIG. 5 is mapped to the A-PPDU frame.

Referring to FIG. 16, the MAC header and the frame body of the MPDU frame may be carried on (i.e., mapped to) different or separate data regions. For example, the MAC header of the MPDU frame may be carried on (i.e., mapped to) PSDU 1 and the frame body of the MPDU frame may be carried on (i.e., mapped to) PSDU 2. The MPDU frame of FIG. 8 and the first to fifth candidate MPDU frames may be mapped to the A-PPDU frame of FIG. 16 as well as the MPDU frame of FIG. 5.

Figure 17:
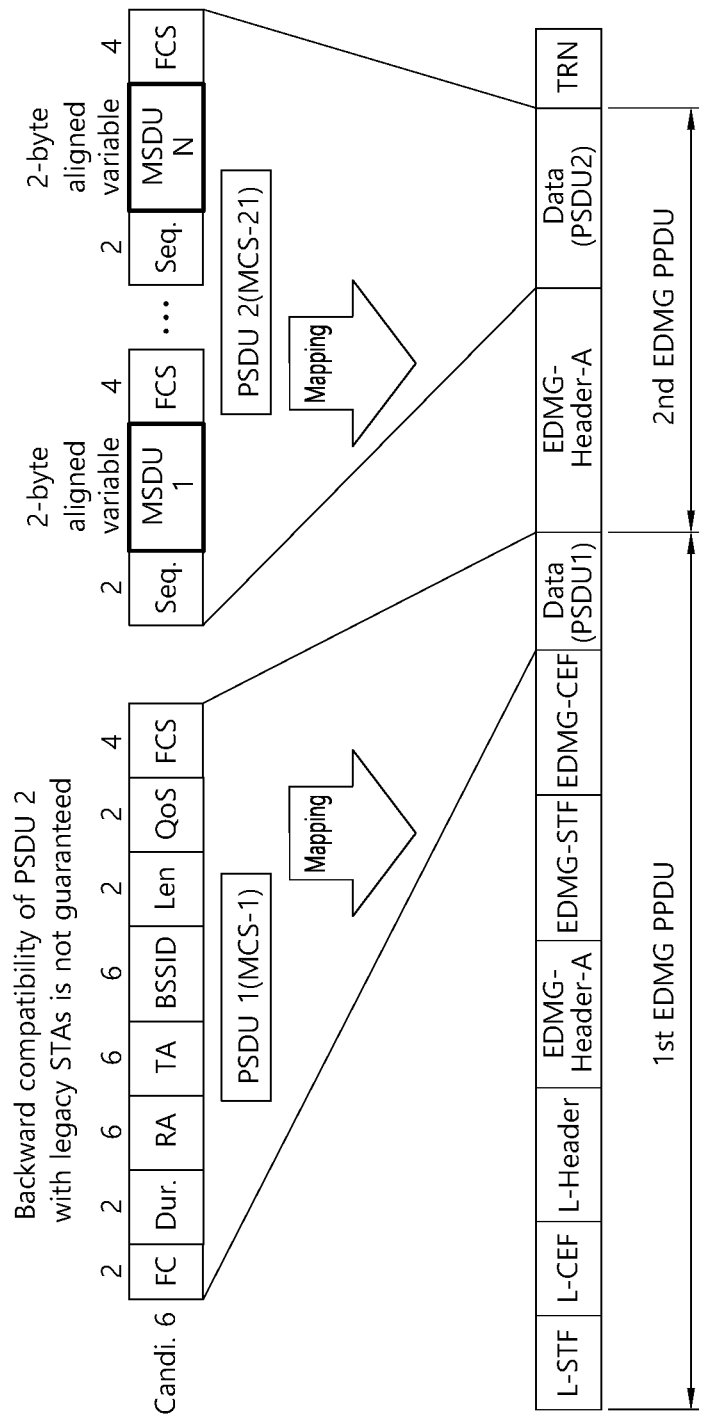
FIG. 17 is another example in which an MPDU frame is mapped to an A-PPDU frame.

FIG. 17 is another example in which an MPDU frame is mapped to an A-PPDU frame. FIG. 17 shows a case in which the second candidate MPDU frame (A-MSDU) according to FIG. 7 is mapped to the A-PPDU frame. Hereinafter, a combination in which the second candidate MPDU frame is mapped to the A-PPDU frame is referred to as a sixth candidate (Candi.6) combination for convenience.

Referring to FIG. 17, in the sixth candidate combination, the MAC header and the frame body of the second candidate MPDU frame are allocated to different PSDUs and are mapped to data regions at different positions within the A-PPDU frame.

As an example, the MAC layer of the transmitting side transmits the second candidate MPDU frame to the physical layer of the transmitting side, and the physical layer of the transmitting side divides the second candidate MPDU frame into a MAC header and a frame body, maps the MAC header to PSDU 1, and maps the frame body to PSDU 2. Thereafter, the physical layer of the transmitting side generates an A-PPDU including a preamble and PSDU 1 and PSDU 2 and transmits the generated A-PPDU to the receiving side. On other hand, the physical layer of the receiving side that has received the A-PPDU extracts the MAC header from PSDU 1, extracts the frame body from PSDU 2, and forwards a second candidate MPDU frame obtained by combining the extracted MAC header and frame body to the MAC layer of the receiving side. Then, the MAC layer of the receiving side interprets and reads the second candidate MPDU frame based on the control information fields of the MAC header and then decodes the data of the frame body.

The performance of the sixth candidate combination according to FIG. 17 is compared to those of the fifth candidate MPDU frame mapped to the general PPDU according to FIG. 15b as shown in FIG. 18.

FIG. 18 shows another example of results of simulation for comparing the performances of various MPDU frames.

Referring to FIG. 18, TRX times of the MPDU frames of FIGS. 4 (a), (d), and (c) corresponding to the legacy MPDU frame, the second candidate MPDU frame, the fifth candidate MPDU frame, and the sixth candidate combination are compared (upper table) and MAC dummies thereof are compared (lower table).

Since the sixth candidate combination is an A-PPDU frame structure, it includes PSDU 1 and EDMG-header B. PSDU 1 and EDMG-header B are dummy of the physical layer added when the A-PPDU frame is used and occupy a transmission time of 1,160 ns as shown in FIG. 14b. On the other hand, in the case of FIG. 17 in which the fifth candidate MPDU frame is mapped to the general PPDU, dummy of the physical layer, such as PSDU 1 and EDMG-header B, is not additionally added. In terms of reducing the MAC dummy, the sixth candidate combination has the best performance, but the sixth candidate combination requires an additional transmission time of 1,160 ns due to the physical layer dummy. Accordingly, even in consideration of the fact that a transmission time of 290 ns is reduced when the physical dummy decreases, the performance of the fifth candidate MPDU frame may be better. This is because the size of the MAC header or the MAC dummy is relatively very small compared to data, and thus the influence of the MAC header reduction is insignificant.

Meanwhile, since the sixth candidate combination does not include the MAC header regarding PSDU 2, backward compatibility for legacy stations may not be guaranteed. Hereinafter, an MPDU frame configured to include the MAC header for each PSDU such that legacy stations can recognize and interpret a PSDU of each data region when the MPDU frame is divided and mapped to a plurality of data regions of an A-PPDU frame will be described.

Figure 19:
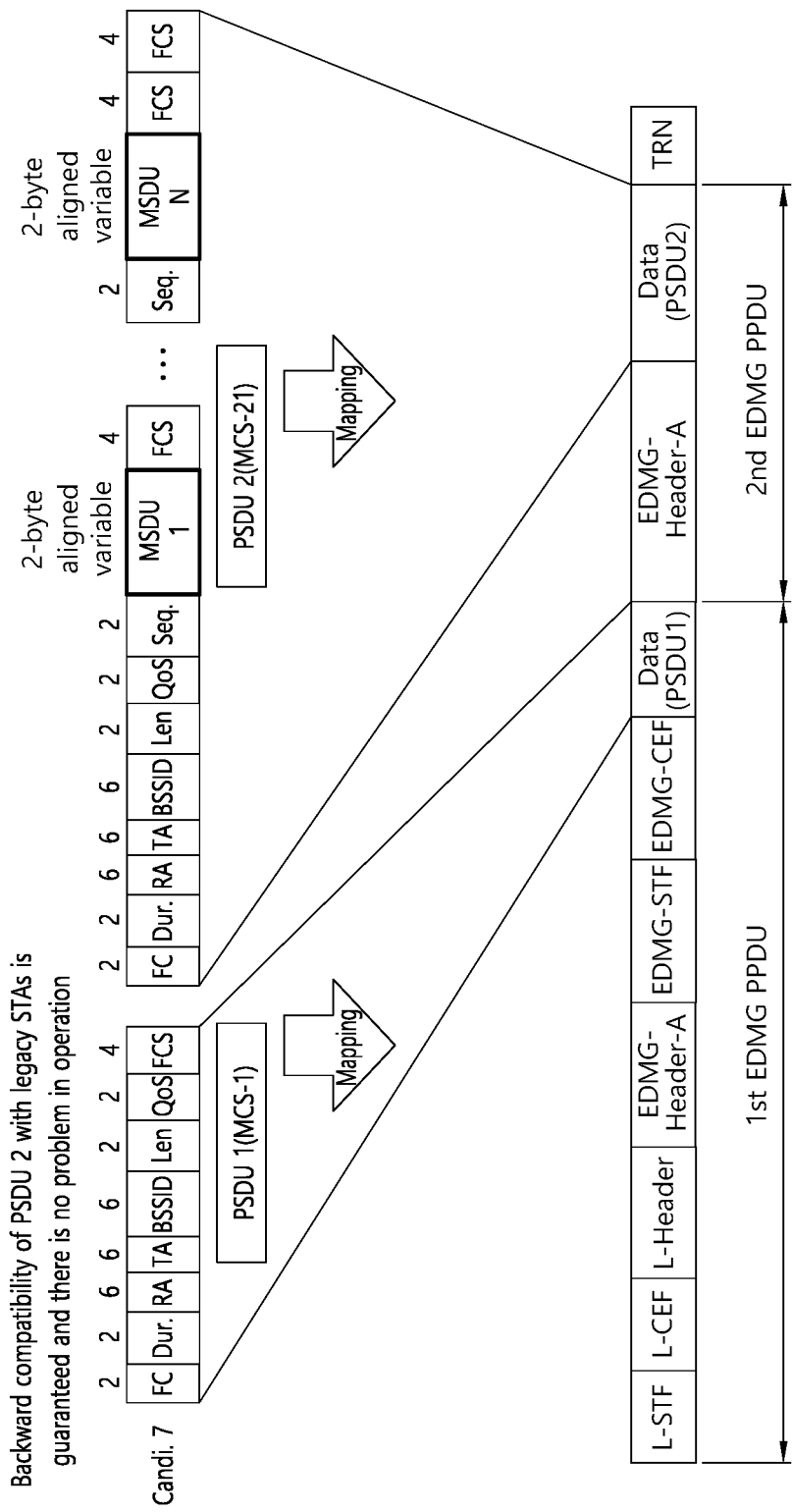
FIG. 19 is another example in which an MPDU frame is mapped to an A-PPDU frame.

FIG. 19 is another example in which an MPDU frame is mapped to an A-PPDU frame. FIG. 19 shows a case in which an MPDU frame similar to the third candidate MPDU frame (A-MSDU) (hereinafter referred to as a third' candidate MPDU frame) is mapped to the A-PPDU frame.

Referring to FIG. 19, the third' candidate MPDU frame includes a MAC header, a frame body, and an FCS.

Specifically, the MAC header of the third' candidate MPDU frame includes the FC field, the duration field, the RA field, the TA field, the BSSID field, the length field, the QoS field and the FCS field regarding the MAC header sequentially from the left on which the MAC header starts to the right.

Meanwhile, the frame body includes a header of the frame body and a plurality of sub-bodies. Here, the header of the frame body may include at least some of the control information fields (e.g., the FC field, the duration field, the RA field, the TA field, the BSSID field, the length field, and the QoS field) of the MAC header of the MPDU frame.

Each sub-body includes a sequence field, an MSDU, and an FCS regarding the MSDU (or sub-body) sequentially from the left on which the sub-body starts to the right.

The third' candidate MPDU frame is different from the third candidate MPDU frame in that it further includes the MAC header (the FC field, the duration field, the RA field, the TA field, the BSSID field, the length field, and the QoS field) at the front end of sub-body 1, and other than that is the same as that of the third candidate MPDU frame.

Hereinafter, a combination in which the third' candidate MPDU frame is mapped to the A-PPDU frame is referred to as a seventh candidate (Candi.7) combination for convenience.

In the seventh candidate combination, the MAC header and the frame body of the third' candidate MPDU frame are allocated to different PSDUs and are mapped to data regions at different positions in the A-PPDU frame. In this case, since PSDUs need to be extracted from a plurality of data regions in the A-PPDU frame, the MAC header is required for each PSDU such that legacy stations can recognize and interpret PSDUs of respective data regions. From this point of view, the seventh candidate combination includes the MAC header corresponding to each PSDU, and this MAC header includes at least fields up to the RA field, thereby ensuring backward compatibility with legacy stations. That is, the seventh candidate combination has an advantage of providing backward compatibility as compared to the sixth candidate combination.

The MAC layer of the transmitting side forwards the third' candidate MPDU frame to the physical layer of the transmitting side, and the physical layer of the transmitting side divides the third' candidate MPDU frame into a MAC header and a frame body, maps the MAC header to PSDU 1 and maps the frame body to PSDU 2. Thereafter, the physical layer of the transmitting side generates an A-PPDU including a preamble, PSDU 1 and PSDU 2 and transmits the generated A-PPDU to the receiving side.

On the other hand, the physical layer of the receiving side that has received the A-PPDU frame interprets the A-PPDU frame based on the preamble of the A-PPDU frame, extracts and decodes the data region based on the preamble of the A-PPDU frame to obtain PSDU 1 and PSDU 2. Thereafter, the physical layer of the receiving side extracts the MAC header from PSDU 1, extracts the frame body and FCS from PSDU 2, and forwards a seventh candidate MPDU frame obtained by combining the MAC header, the frame body and the FCS to the MAC layer. The MAC layer interprets the seventh candidate MPDU frame based on the MAC header and the header of the frame body. Specifically, the MAC layer sequentially decodes the FC field, the duration field, and the RA field included in the MAC header, and checks whether the corresponding MPDU frame is an MPDU frame intended therefor from the RA field. When the address indicated by the RA field is the same as the receiving side address, it can be confirmed that the corresponding MPDU frame is an MPDU frame intended for the receiving side. When it is confirmed that the MPDU frame is intended for the receiving side in this manner, the MSDU of each sub-body is obtained based on the length field and the QoS field. The MAC layer of the receiving side checks whether there is a transmission error of the MSDU based on the FCS regarding each MSDU, and if it is determined that there is no transmission error, forwards the corresponding MSDU to the higher layer.

Figure 20:
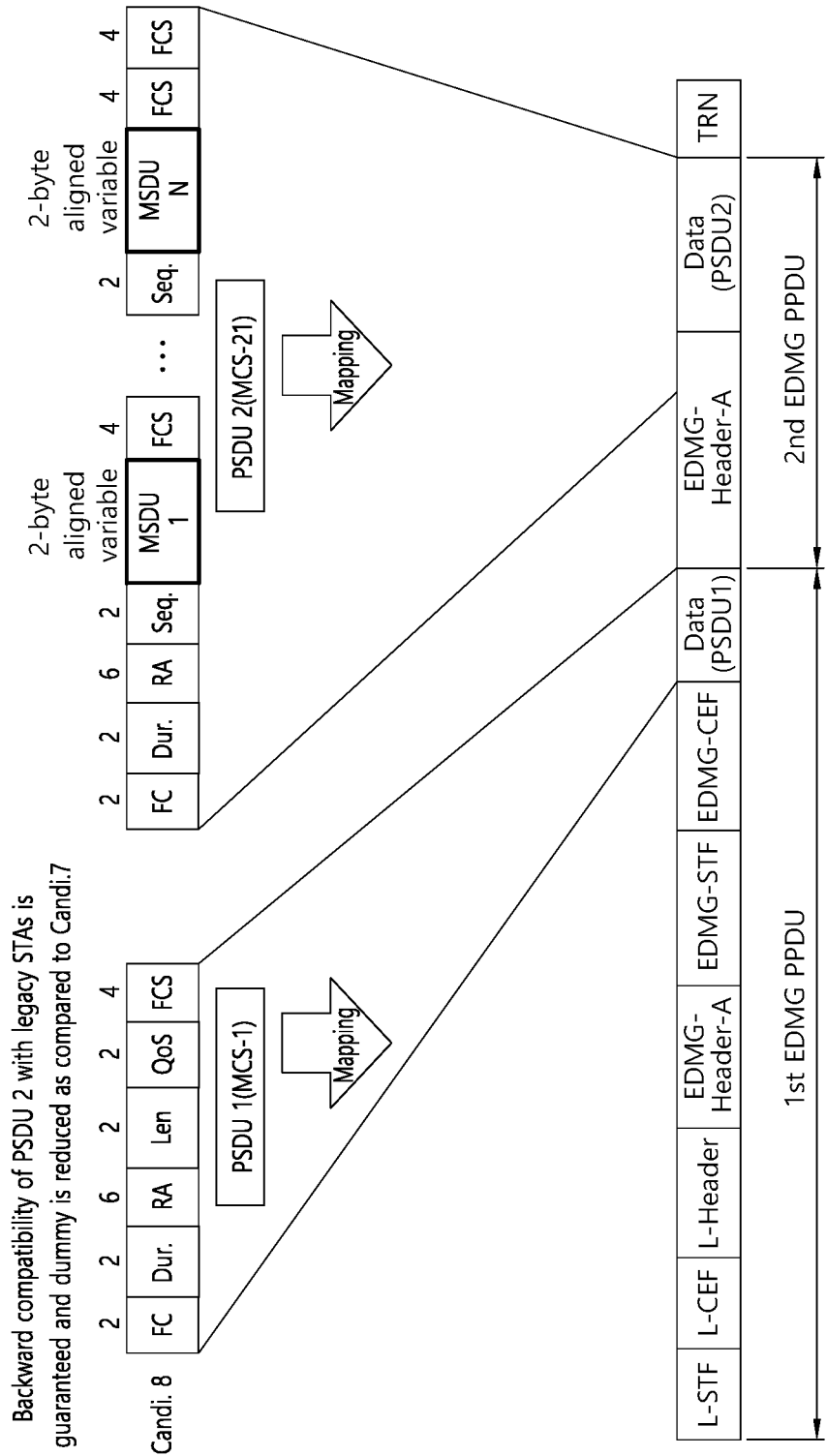
FIG. 20 is another example in which an MPDU frame is mapped to an A-PPDU frame.

FIG. 20 is another example in which an MPDU frame is mapped to an A-PPDU frame.

Referring to FIG. 20, an eighth candidate (Candi.8) MPDU frame is an MPDU frame in which elements that are not essential in a wireless AV system are omitted from the MAC header and is designed to satisfy backward compatibility with legacy stations. That is, fields up to the first address (address1) information field of the MAC header are not changed and fields subsequent to the first address information field are omitted such that the MAC header is reduced. Accordingly, backward compatibility with IEEE 802.11ad or ay standards can be maintained.

This eighth candidate MPDU frame includes a MAC header, a frame body, and an FCS.

Specifically, the MAC header of the eighth candidate MPDU frame includes the FC field, the duration field, the RA field, the length field, the QoS field, and the FCS field regarding the MAC header sequentially from the left on which the MAC header starts to the right. Meanwhile, the frame body includes a header of the frame body and a plurality of sub-bodies. Here, the header of the frame body may include at least some of the control information fields (e.g., the FC field, the duration field, and the RA field) of the MAC header of the MPDU frame.

Each sub-body includes a sequence field, an MSDU, and an FCS regarding the MSDU (or sub-body) sequentially from the left on which the sub-body starts to the right.

The MAC layer of the transmitting side generates the eighth candidate MPDU frame and forwards the same to the physical layer of the transmitting side, and the physical layer of the transmitting side maps the eighth candidate MPDU frame to the A-PPDU frame as a PSDU. At this time, the physical layer of the transmitting side divides the eighth candidate MPDU frame into a MAC header, a frame body, and an FCS, maps the MAC header to PSDU 1, and maps the frame body and the FCS to PSDU 2. Then, the physical layer of the transmitting side adds a preamble (i.e., L-STF, L-CEF, L-header, EDMG-header A, EDMG-STF, EDMG-CEF) to the front end of PSDU 1, adds EDMG-header B to the rear end of PSDU 1, and adds PSDU 2 and TRN after EDMG-header B to generate an A-PPDU frame. The physical layer of the transmitting side transmits the generated A-PPDU frame to the receiving side.

On the other hand, the physical layer of the receiving side that has received the A-PPDU frame interprets the A-PPDU frame based on the preamble of the A-PPDU frame, extracts and decodes the data region based on the preamble of the A-PPDU frame to obtain PSDU 1 and PSDU 2. Thereafter, the physical layer of the receiving side extracts the MAC header from PSDU 1, extracts the frame body and the FCS from PSDU 2, and forwards an eighth candidate MPDU frame obtained by combining the MAC header, the frame body and the FCS to the MAC layer. The MAC layer interprets the eighth candidate MPDU frame based on the MAC header and the header of the frame body. Specifically, the MAC layer sequentially decodes the FC field, the duration field, and the RA field included in the MAC header, and checks whether the corresponding MPDU frame is an MPDU frame intended therefor from the RA field. When the address indicated by the RA field is the same as the receiving side address, it can be confirmed that the corresponding MPDU frame is an MPDU frame intended for the receiving side. When it is confirmed that the MPDU frame is intended for the receiving side in this manner, the MSDU of each sub-body is obtained based on the length field and the QoS field. The MAC layer of the receiving side checks whether there is a transmission error of the MSDU based on the FCS regarding each MSDU, and if it is determined that there is no transmission error, forwards the corresponding MSDU to the higher layer.

In the embodiment of FIG. 20, when the transmitting side is the wireless data transmission apparatus 1100 and the receiving side is the wireless data reception apparatus 1200, the operations of the MAC layer and the physical layer of the transmitting side may be performed by the communication unit 1140 of the wireless data transmission apparatus 1100, and the operations of the MAC layer and the physical layer of the receiving side may be performed by the communication unit 1210 of the wireless data reception apparatus 1200. On the other hand, in the embodiment of FIG. 20, when the transmitting side is the wireless data reception apparatus 1200 and the receiving side is the wireless data transmission apparatus 1100, the operations of the MAC layer and the physical layer of the transmitting side may be performed by the communication unit 1210 of the wireless data reception apparatus 1200, and the operations of the MAC layer and the physical layer of the receiving side may be performed by the communication unit 1140 of the wireless data transmitting apparatus 1100.

Figure 21:
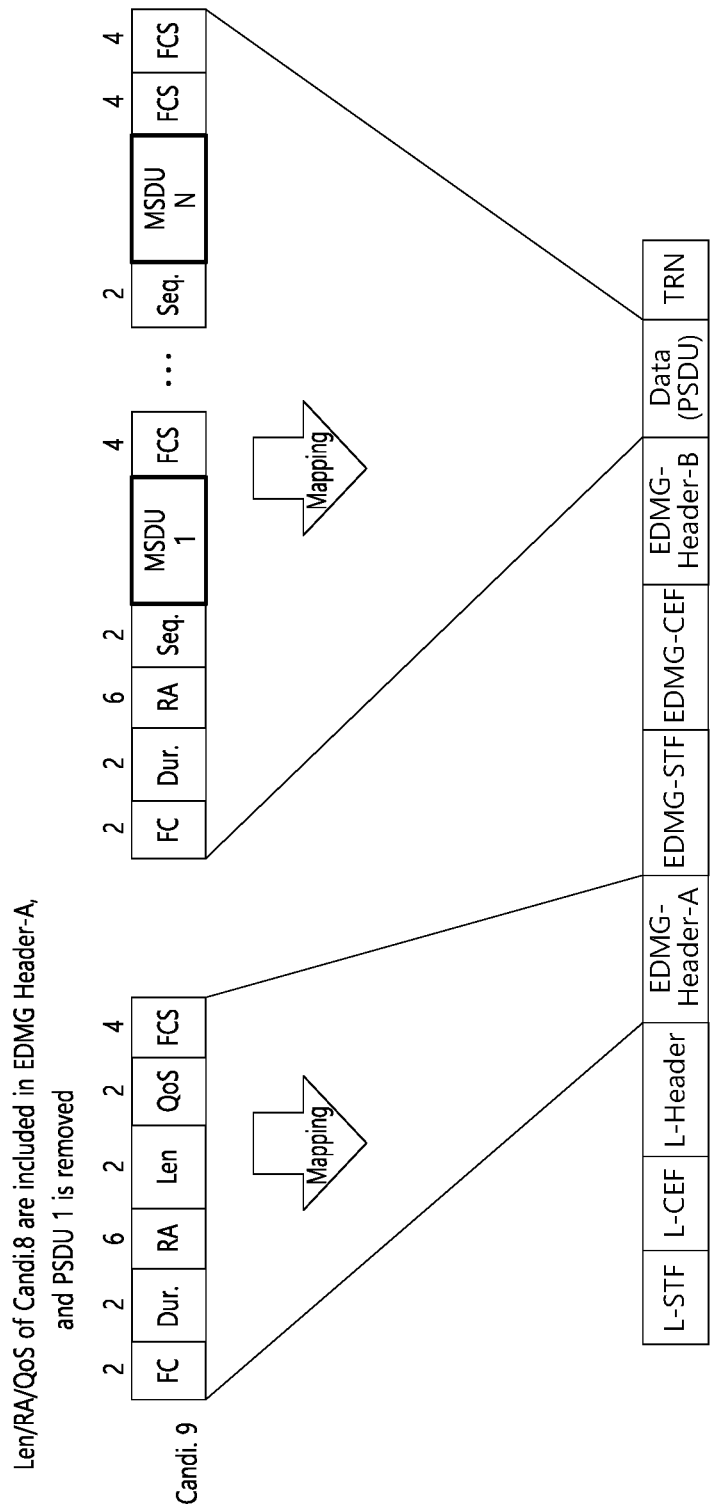
FIG. 21 is another example in which an MPDU frame is mapped to a PPDU frame.

FIG. 21 is another example in which an MPDU frame is mapped to a PPDU frame.

Referring to FIG. 21, a ninth candidate (Candi.9) MPDU frame is an MPDU frame in which elements (e.g., the TA field and the BSSID field) that are not essential in a wireless AV system are omitted from the MAC header and is designed to satisfy backward compatibility with legacy stations. That is, fields up to the first address (address1) information field of the MAC header are not changed and fields subsequent to the first address information field are omitted such that the MAC header is reduced. Accordingly, backward compatibility with IEEE 802.11ad or ay standards can be maintained.

The ninth candidate MPDU frame includes a MAC header, a frame body, and an FCS regarding the MAC header.

Specifically, the MAC header of the ninth candidate MPDU frame includes the FC field, the duration field, the RA field, the length field, the QoS field, and the FCS regarding the MAC header sequentially from the left on which the MAC header starts to the right. Meanwhile, the frame body includes a header of the frame body and a plurality of sub-bodies. Here, the header of the frame body may include at least some of the control information fields (e.g., the FC field, the duration field, and the RA field) of the MAC header of the MPDU frame.

Each sub-body includes a sequence field, an MSDU, and an FCS regarding the MSDU (or sub-body) sequentially from the left on which the sub-body starts to the right.

The MAC layer of the transmitting side generates the ninth candidate MPDU frame and transmits the same to the physical layer of the transmitting side, and the physical layer of the transmitting side maps the ninth candidate MPDU frame to the PPDU frame as a PSDU. In this case, the physical layer of the transmitting side divides the ninth candidate MPDU frame into a MAC header, a frame body, and an FCS.

The physical layer of the transmitting side maps at least some control information fields of the MAC header or the indication of the control information fields to the preamble, and maps the frame body and the FCS to the data region as PSDUs. That is, at least some fields or indications thereof of the MAC header are mapped to the preamble, and the frame body and the FCS are mapped to the data region.

As an example, the physical layer of the transmitting side may map at least one of the RA field, the length field, and the QoS field among the control information fields of the MAC header to the preamble. Here, the preamble to which at least one of the RA field, the length field, and the QoS field is mapped may be, for example, EDMG-header A.

Next, the physical layer of the transmitting side adds a preamble (i.e., L-STF, L-CEF, L-header, EDMG-header A, EDMG-STF, EDMG-CEF, and EDMG-header B) to the front end of the data region (PSDU) and adds TRN to the rear end of the data region to generate a PPDU frame. Then, the physical layer of the transmitting side transmits the generated PPDU frame to the receiving side.

On the other hand, the physical layer of the receiving side that has received the PPDU frame interprets the PPDU frame based on the preamble of the PPDU frame. Specifically, the physical layer of the receiving side may obtain MAC header related information mapped to the preamble from the preamble of the PPDU frame. For example, the physical layer of the receiving side may obtain information related to at least one of the RA field, the length field, and the QoS field from EDMG-header A.

The physical layer of the receiving side extracts and decodes the data region based on analysis of the preamble of the PPDU frame to obtain the PSDU.

Next, the physical layer of the receiving side acquires the frame body and the FCS from the PSDU, generates a ninth candidate MPDU frame, and forwards the same to the MAC layer.

The MAC layer of the receiving side interprets the ninth candidate MPDU frame based on the MAC header and the header of the frame body. Specifically, the MAC layer checks whether the corresponding MPDU frame is an MPDU frame intended therefor from the RA value. When the address indicated by the RA value is the same as the receiving address, it can be confirmed that the corresponding MPDU frame is an MPDU frame intended for the receiving side. When it is confirmed that the MPDU frame is intended for the receiving side in this manner, the MSDU of each sub-body is obtained based on the length field and the QoS field. The MAC layer of the receiving side checks whether there is a transmission error of the MSDU based on the FCS regarding each MSDU, and if it is determined that there is no transmission error, forwards the corresponding MSDU to the higher upper layer.

In the embodiment of FIG. 21, when the transmitting side is the wireless data transmission apparatus 1100 and the receiving side is the wireless data reception apparatus 1200, the operations of the MAC layer and the physical layer of the transmitting side may be performed by the communication unit 1140 of the wireless data transmission apparatus 1100, and the operations of the MAC layer and the physical layer of the receiving side may be performed by the communication unit 1210 of the wireless data reception apparatus 1200. On the other hand, in the embodiment of FIG. 21, when the transmitting side is the wireless data reception apparatus 1200 and the receiving side is the wireless data transmission apparatus 1100, the operations of the MAC layer and the physical layer of the transmitting side may be performed by the communication unit 1210 of the wireless data reception apparatus 1200, and the operations of the MAC layer and the physical layer of the receiving side may be performed by the communication unit 1140 of the wireless data transmission apparatus 1100.

FIG. 22 is another example of results of simulation for comparing the performances of various MPDU frames.

Referring to FIG. 22, TRX times of the MPDU frames of FIGS. 4 (*a*), (*d*), and (*c*) corresponding to the legacy MPDU frame, the second candidate MPDU frame, the fifth candidate MPDU frame, the sixth candidate combination, and the ninth candidate combination are compared (upper table) and MAC dummies thereof are compared (lower table).

Since the sixth candidate combination includes a physical layer dummy (PSDU 1 and EDMG-header A) added when the A-PPDU frame is used, it has a disadvantage of occupying a transmission time of 1,160 ns as shown in FIG. 14*b*. On the other hand, in the ninth candidate combination, the MPDU frame is mapped to the general PPDU, and thus a physical layer dummy is not added, and further, control information fields (TA field and BSSID field) unnecessary for the wireless AV system are removed. Accordingly, the ninth candidate combination has better performance than the fifth candidate MPDU frame.

Since the device and method for receiving wireless data or the device and method for transmitting wireless data according to the above-described embodiments of the present disclosure do not mandatorily require all of the components or operations that are described above, the device and method for receiving wireless data or the device and method for transmitting wireless data may be performed by including all or part of the above-described components or operations. Additionally, the above-described embodiments of the device and method for receiving wireless data or the device and method for transmitting wireless data may be performed in combination with each other. Furthermore, the above-described components or operations are not mandatorily required to be performed in the order that is described above, and, therefore, it is also possible for components or operations (or process steps) that are described in a later order to be performed before the components or operations (or process steps) that are described in an earlier order.

The foregoing description has been presented merely to provide an exemplary description of the technical idea of the present disclosure, and it will be apparent to those skilled in the art to which the present disclosure pertains, that various changes and modifications in the embodiments described herein can be made without departing from the scope and spirit of the present disclosure. Therefore, the embodiments of the present disclosure described above can be implemented separately or in combination with each other.

The embodiments disclosed herein are provided not to limit the technical idea of the present disclosure but to describe the present disclosure, and the scope of the technical idea of the present disclosure should not be limited to these embodiments. The scope of the present disclosure should be interpreted by the following claims, and all technical ideas within the scope of equivalents thereto should be construed as being included in the scope of the present disclosure.

What is claimed is:

1. An apparatus for transmitting data in a wireless audio video (AV) system, the apparatus comprising:
    a processor configured to code media data to generate a compressed bitstream; and
    a communication unit configured to fragment the compressed bitstream, to map the fragmented compressed bitstream to a medium access channel (MAC) service data unit (MSDU), to generate a MAC protocol data unit (MPDU) sequentially including a MAC header, a frame body, and a frame check sequence (FCS) regarding the MAC header for transmission of the MSDU, to generate a PHY protocol data unit (PPDU) sequentially including a preamble, at least one PHY service data unit (PSDU), and a training (TRN) field for transmission of the MPDU frame, and to transmit the PPDU frame through a wireless channel,
    wherein the MAC header sequentially includes a frame control (FC) field, a duration field, and a receiver address (RA) field, and the MAC header includes only the RA field as a field related to an address,
    wherein the MAC header sequentially includes the FC field, the duration field, the RA field, a length field, and a quality of service (QoS) field,
    the frame body includes a header of the frame body and a plurality of sub-bodies,
    the header of the frame body sequentially includes the FC field, the duration field, and the RA field, and
    each sub-body sequentially includes a sequence field, an MSDU corresponding to the sequence field, and an FCS regarding the frame body.

2. The apparatus of claim 1, wherein 0 bits are allocated to a service set ID (SSID) field in the MAC header.

3. The apparatus of claim 1, wherein the communication unit determines whether to perform retransmission in units of MSDUs of each sub-body based on the FCS regarding the frame body.

4. The apparatus of claim 1, wherein the communication unit maps the MAC header to a first PSDU, maps the frame body and the FCS regarding the MAC header to a second PSDU, and generates an aggregated PPDU (A-PPDU) frame by aggregating the first PSDU and the second PSDU.

5. The apparatus of claim 1, wherein the communication unit maps at least a portion of the MAC header to at least a portion of the preamble and maps the frame body and the FCS regarding the MAC header to the PSDU to generate the PPDU frame.

6. The apparatus of claim 5, wherein at least a portion of the preamble is enhanced directional multi-gigabit-header A (EDMG-header A).

7. The apparatus of claim 5, wherein at least a portion of the MAC header is the RA field, the length field, and the QoS field.

8. An apparatus for receiving data in a wireless audio video (AV) system, the apparatus comprising:
    a communication unit configured to receive a PHY protocol data unit (PPDU) frame through a wireless channel, to obtain a preamble, at least one PHY service data unit (PSDU), and a training (TRN) field from the PPDU frame, to obtain a MAC protocol data unit (MPDU) frame from the PSDU, to obtain a MAC header, a frame body, and a frame check sequence (FCS) regarding the MAC header from the MPDU frame, to obtain a fragmented medium access channel (MAC) service data unit (MSDU) from the frame body, and to obtain a compressed bitstream from the fragmented MSDU; and
    a processor configured to decode the compressed bitstream to obtain media data,
    wherein the MAC header sequentially includes a frame control (FC) field, a duration field, and a receiver address (RA) field, and the MAC header includes only the RA field as a field related to an address,
    wherein the MAC header sequentially includes the FC field, the duration field, the RA field, a length field, and a quality of service (QoS) field,
    the frame body includes a header of the frame body and a plurality of sub-bodies,
    the header of the frame body sequentially includes the FC field, the duration field, and the RA field, and
    each sub-body sequentially includes a sequence field, an MSDU corresponding to the sequence field, and an FCS regarding the frame body.

9. The apparatus of claim 8, wherein 0 bits are allocated to a service set ID (SSID) field in the MAC header.

10. The apparatus of claim 8, wherein the communication unit determines whether there is a reception error in units of MSDUs of each sub-body based on the FCS regarding the frame body.

11. The apparatus of claim 8, wherein the communication unit obtains a first PSDU and a second PSDU from an aggregated PPDU (A-PPDU) frame, obtains the MAC header from the first PSDU, and obtains the frame body and the FCS regarding the MAC header from the second PSDU.

12. The apparatus of claim 8, wherein the communication unit obtains at least a portion of the MAC header from at least a portion of the preamble and obtains the frame body and the FCS regarding the MAC header from the PPDU frame.

13. The apparatus of claim 12, wherein at least a portion of the preamble is enhanced directional multi-gigabit-header A (EDMG-header A).

14. The apparatus of claim 12, wherein at least a portion of the MAC header is the RA field, the length field, and the QoS field.

* * * * *